United States Patent
Yokokawa et al.

(10) Patent No.: US 11,202,045 B2
(45) Date of Patent: Dec. 14, 2021

(54) IMAGE PROCESSING APPARATUS, IMAGING APPARATUS, IMAGE PROCESSING METHOD, AND PROGRAM

(71) Applicant: SONY CORPORATION, Tokyo (JP)

(72) Inventors: Masatoshi Yokokawa, Kanagawa (JP); Kazunori Kamio, Kanagawa (JP); Masashi Uchida, Tokyo (JP)

(73) Assignee: SONY CORPORATION, Tokyo (JP)

( * ) Notice: Subject to any disclaimer, the term of this patent is extended or adjusted under 35 U.S.C. 154(b) by 743 days.

(21) Appl. No.: 16/070,952

(22) PCT Filed: Dec. 5, 2016

(86) PCT No.: PCT/JP2016/086062
§ 371 (c)(1),
(2) Date: Jul. 18, 2018

(87) PCT Pub. No.: WO2017/154293
PCT Pub. Date: Sep. 14, 2017

(65) Prior Publication Data
US 2021/0076017 A1     Mar. 11, 2021

(30) Foreign Application Priority Data

Mar. 9, 2016   (JP) .............................. JP2016-045224

(51) Int. Cl.
*H04N 9/64*       (2006.01)
*H04N 9/09*       (2006.01)
(Continued)

(52) U.S. Cl.
CPC ............ *H04N 9/646* (2013.01); *G06T 5/001* (2013.01); *G06T 5/20* (2013.01); *G06T 5/50* (2013.01);
(Continued)

(58) Field of Classification Search
CPC .. H04N 9/646; H04N 9/0451; H04N 9/04557; H04N 9/0455; H04N 9/09;
(Continued)

(56) References Cited

U.S. PATENT DOCUMENTS 6,614,471 B1    9/2003 Ott
7,796,814 B2 *  9/2010 Sato .................... H04N 9/04559
                                              382/167
(Continued)

FOREIGN PATENT DOCUMENTS

JP    2013-026672 A    2/2013
JP    2013-219705 A    10/2013
JP    2013-239904 A    11/2013

OTHER PUBLICATIONS

Feb. 5, 2019, European Search Report issued for related EP Application No. 16893617.7.

*Primary Examiner* — Brian P Yenke
(74) *Attorney, Agent, or Firm* — Paratus Law Group, PLLC

(57) ABSTRACT

An apparatus and a method that perform a false color correction according to image characteristics of a color image in units of image regions are provided. Included therein is an image processor that receives inputs of a color image and a white (W) image photographed by a W array imaging element whose all pixels are placed in a white (W) pixel array and executes an image process that reduces false colors included in the color image. Together with a frequency-corresponding parameter calculation unit that receives an input of the white (W) image and calculates a frequency-corresponding parameter in units of image regions, and a positional deviation-corresponding parameter calculation unit that receives inputs of the white (W) image and the color image and calculates a positional deviation-corresponding parameter of the two input images in units of (Continued)

image regions, the image processor executes a blending process and calculates a corrected pixel value.

18 Claims, 18 Drawing Sheets

(51) Int. Cl.
    *H04N 9/04*     (2006.01)
    *H04N 9/73*     (2006.01)
    *G06T 5/00*     (2006.01)
    *G06T 5/20*     (2006.01)
    *G06T 5/50*     (2006.01)
    *H04N 5/232*     (2006.01)

(52) U.S. Cl.
    CPC ....... *H04N 5/23258* (2013.01); *H04N 9/0451* (2018.08); *H04N 9/04555* (2018.08); *H04N 9/04557* (2018.08); *H04N 9/09* (2013.01); *H04N 9/735* (2013.01); *G06T 2207/10024* (2013.01); *G06T 2207/20212* (2013.01)

(58) Field of Classification Search
    CPC .... H04N 9/735; H04N 5/23258; G06T 5/001; G06T 5/20; G06T 5/50
    See application file for complete search history.

(56) References Cited

U.S. PATENT DOCUMENTS

| | | | | |
|---|---|---|---|---|
| 8,314,863 B2* | 11/2012 | Tachi | ................. | H04N 9/04559 348/241 |
| 8,467,088 B2* | 6/2013 | Hosaka | .............. | H04N 9/04559 358/1.9 |
| 8,755,640 B2* | 6/2014 | Saito | .................. | H04N 9/04555 382/300 |
| 8,803,985 B2* | 8/2014 | Kaizu | .................. | H04N 5/2355 348/208.4 |
| 8,837,853 B2* | 9/2014 | Tachi | ................. | H04N 9/04519 382/263 |
| 8,948,506 B2* | 2/2015 | Saito | ..................... | G06T 3/4015 382/165 |
| 9,124,809 B2* | 9/2015 | Kaizu | .................. | H04N 5/3559 |
| 9,147,230 B2* | 9/2015 | Saito | ................. | H04N 9/04515 |
| 9,179,113 B2* | 11/2015 | Tachi | .................... | H04N 9/045 |
| 9,191,593 B2* | 11/2015 | Hosaka | .............. | H04N 9/04559 |
| 9,288,457 B2* | 3/2016 | Saito | .................... | G06K 9/6215 |
| 9,344,639 B2* | 5/2016 | Musatenko | ................ | G06T 5/50 |
| 9,609,291 B2* | 3/2017 | Saito | ................. | H04N 9/04515 |
| 9,654,700 B2* | 5/2017 | Kovtun | .................. | G06T 5/002 |
| 9,699,429 B2* | 7/2017 | Kaizu | ............... | H04N 9/04555 |
| 9,712,792 B2* | 7/2017 | Shi | ........................ | H04N 5/379 |
| 9,826,177 B2* | 11/2017 | Kono | .................... | H04N 5/142 |
| 10,200,664 B2* | 2/2019 | Kaizu | .................. | H04N 9/735 |
| 2007/0153335 A1* | 7/2007 | Hosaka | .................. | H04N 5/367 358/463 |
| 2011/0050918 A1* | 3/2011 | Tachi | ................. | H04N 9/04559 348/208.4 |
| 2012/0257821 A1* | 10/2012 | Saito | ..................... | G06T 3/4015 382/162 |
| 2013/0272605 A1* | 10/2013 | Saito | .................. | H04N 9/04555 382/167 |
| 2014/0098265 A1* | 4/2014 | Hosaka | .............. | H04N 9/04553 348/246 |
| 2014/0240567 A1* | 8/2014 | Saito | ................. | H04N 9/04515 348/302 |
| 2014/0253808 A1* | 9/2014 | Tachi | ...................... | H04N 9/64 348/624 |
| 2014/0313400 A1* | 10/2014 | Kaizu | .................. | H04N 5/3559 348/362 |
| 2015/0055873 A1 | 2/2015 | Lee et al. | | |
| 2015/0103212 A1* | 4/2015 | Saito | ...................... | G06T 5/005 348/242 |
| 2015/0215595 A1* | 7/2015 | Yoshida | .................. | G06T 11/60 348/242 |
| 2016/0050354 A1 | 2/2016 | Musatenko et al. | | |
| 2016/0210760 A1* | 7/2016 | Saito | ..................... | G06T 3/4015 |
| 2016/0269693 A1* | 9/2016 | Moriguchi | .......... | H04N 9/04515 |
| 2016/0309131 A1* | 10/2016 | Kikuchi | .................... | G06T 5/50 |
| 2016/0337623 A1* | 11/2016 | Onishi | .................. | H04N 5/349 |
| 2017/0251188 A1* | 8/2017 | Kaizu | .................. | G06T 3/4015 |
| 2020/0112705 A1* | 4/2020 | Yokokawa | ......... | H04N 9/04515 |
| 2020/0296343 A1* | 9/2020 | Kidoguchi | ............... | H04N 9/77 |

* cited by examiner

FIG. 2

(a) RGB ARRAY (BAYER ARRAY)

(b) W ARRAY

FIG. 5
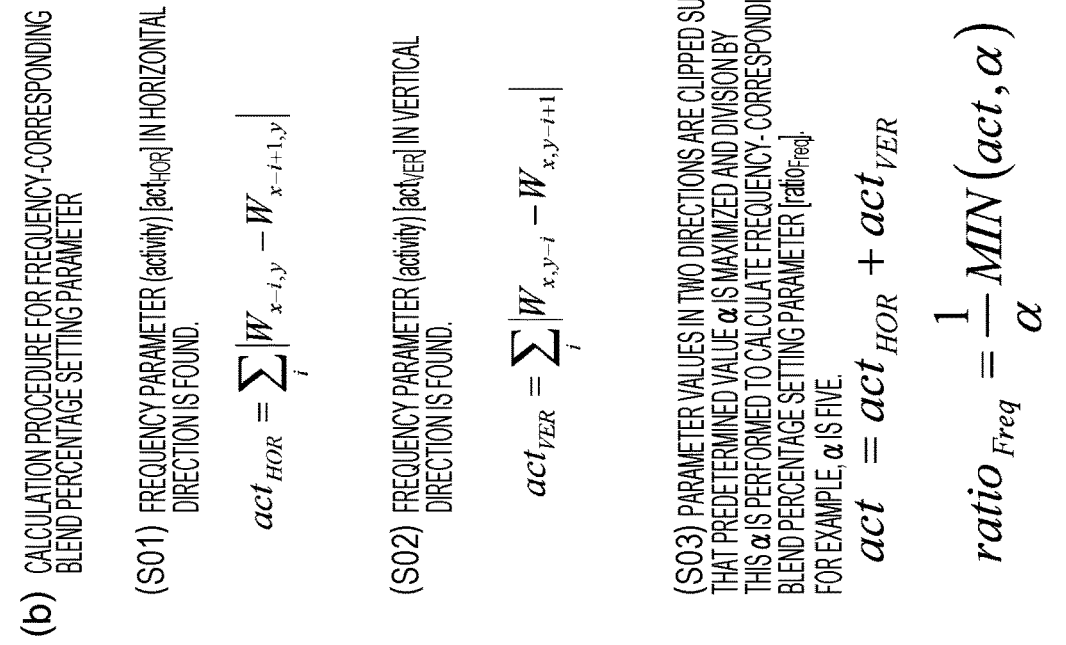
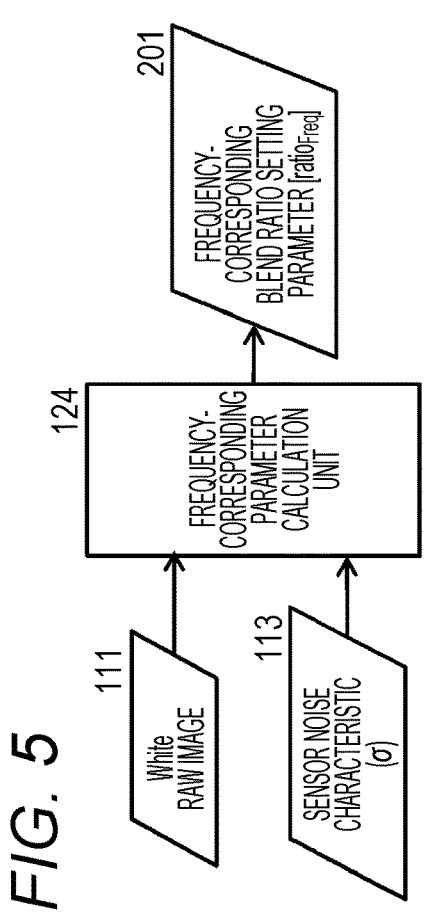
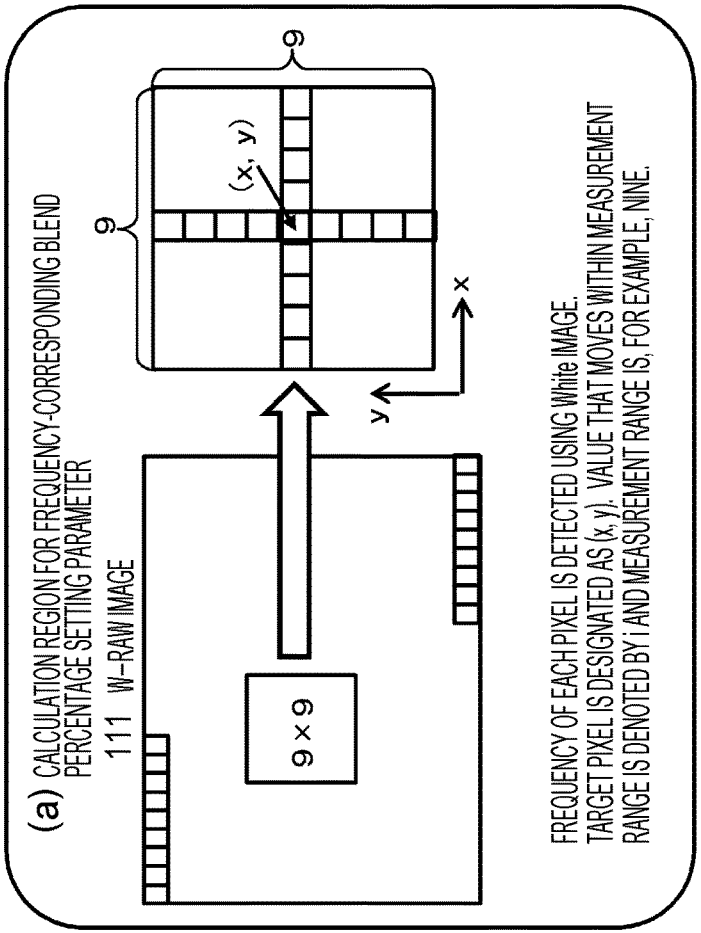

FIG. 12

| (a) CHARACTERISTICS OF IMAGE REGION | (b) PARAMETER VALUE | (c) APPLIED FILTER | (d) CORRECTED UV VALUE (Uout, Vout) | (b) BLEND RATIO SETTING EXAMPLE FOR RGB SENSOR OUTPUT IMAGE AND W SENSOR OUTPUT IMAGE |
|---|---|---|---|---|
| (1) FREQUENCY = LOW POSITIONAL DEVIATION = SMALL | $ratio_{Freq} < Th_{f1}$ AND $ratio_{Err} < Th_{e1}$ | $LPF_0$ | $U_0 = LPF_0(U)$ $V_0 = LPF_0(V)$ | RGB \| W  —  RGB SENSOR OUTPUT > W SENSOR OUTPUT |
| (2) OTHER THAN (1) AND (3) | OTHER THAN (1) AND (3) | $LPF_1$ | $U_1 = LPF_1(U)$ $V_1 = LPF_1(V)$ | RGB \| W  —  RGB SENSOR OUTPUT ≈ W SENSOR OUTPUT |
| (3) FREQUENCY = HIGH POSITIONAL DEVIATION = LARGE | $Th_{f2} \leq ratio_{Freq}$ AND $Th_{e2} \leq ratio_{Err}$ | $LPF_2$ | $U_2 = LPF_2(U)$ $V_2 = LPF_2(V)$ | RGB \| W  —  RGB SENSOR OUTPUT < W SENSOR OUTPUT |

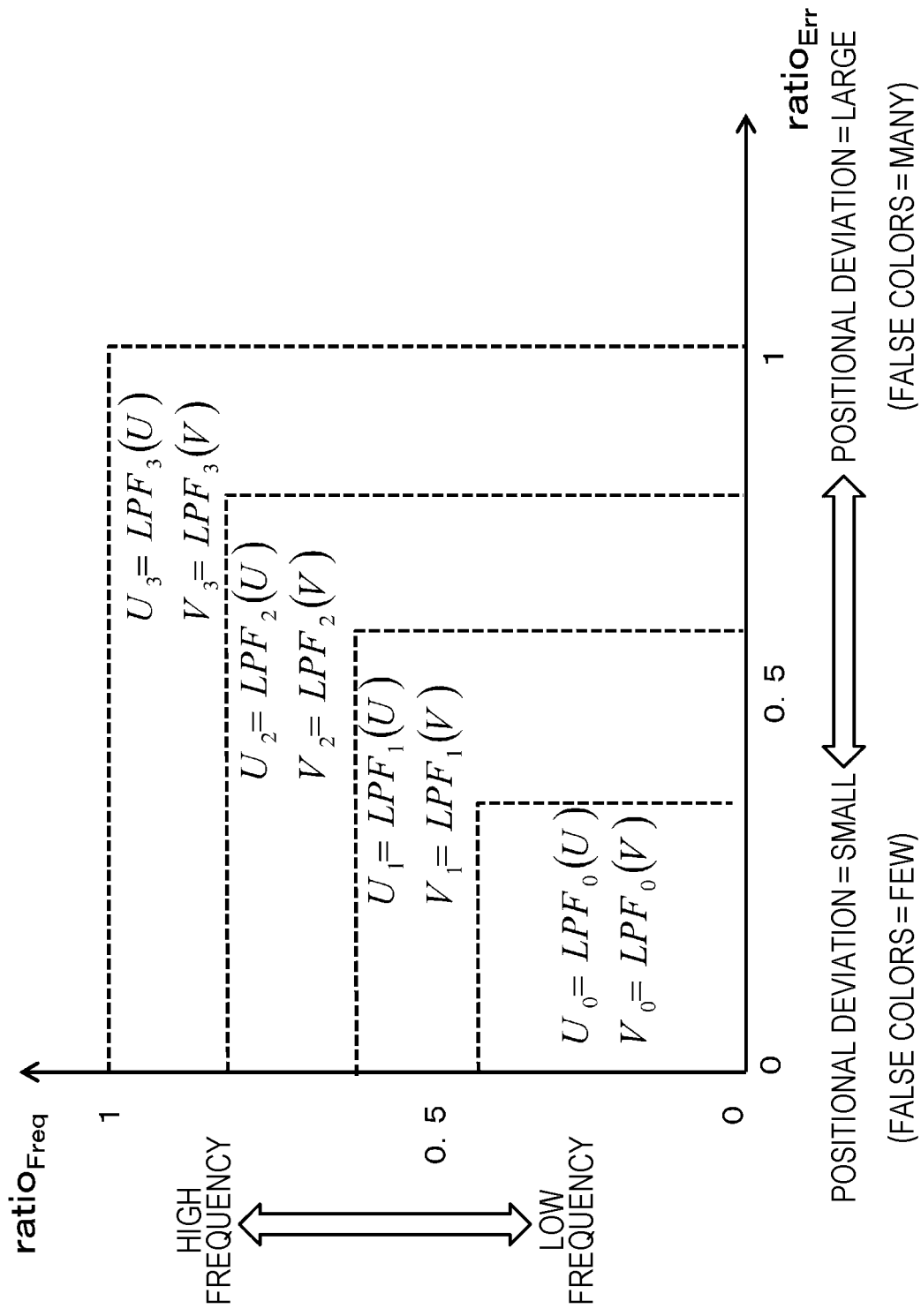

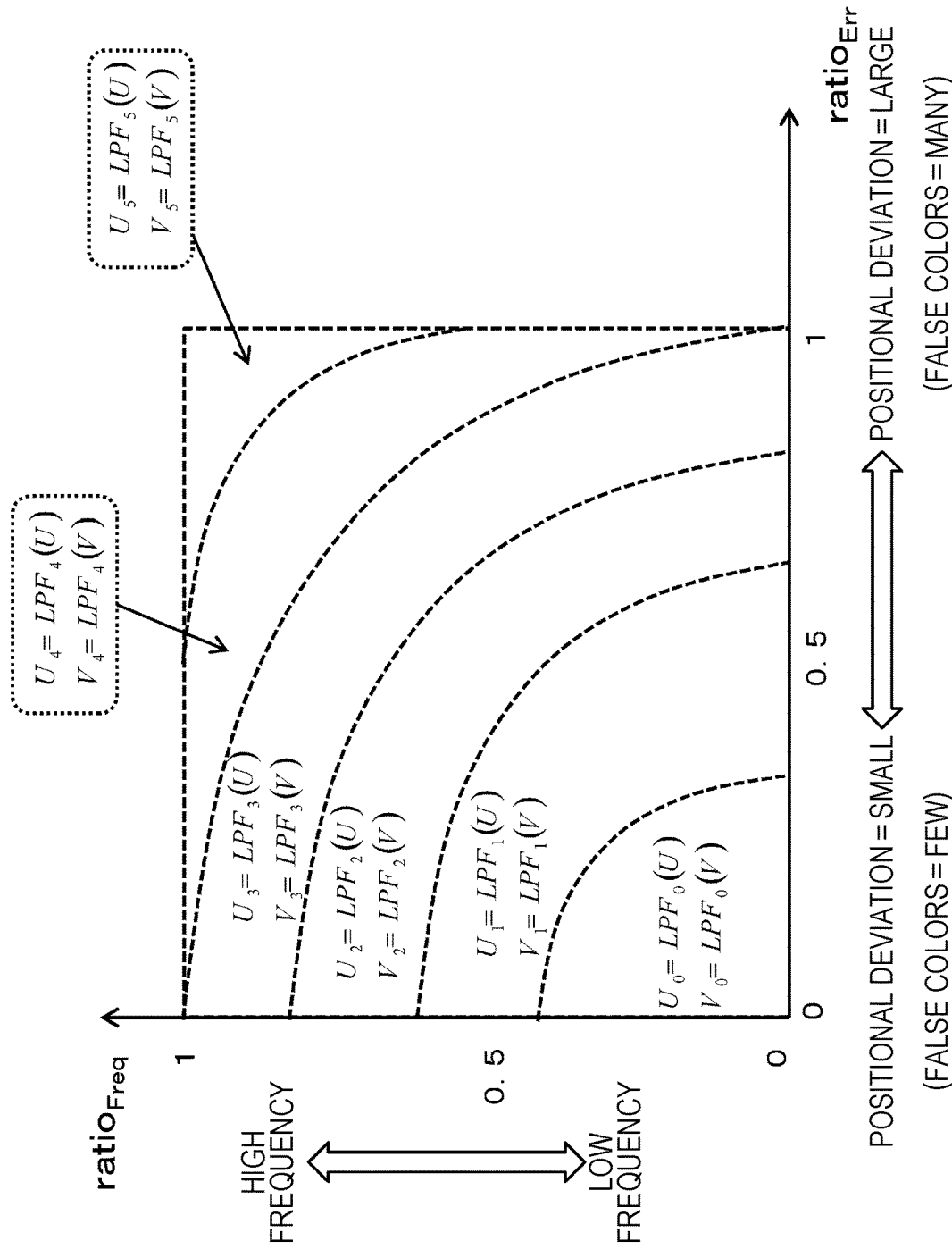

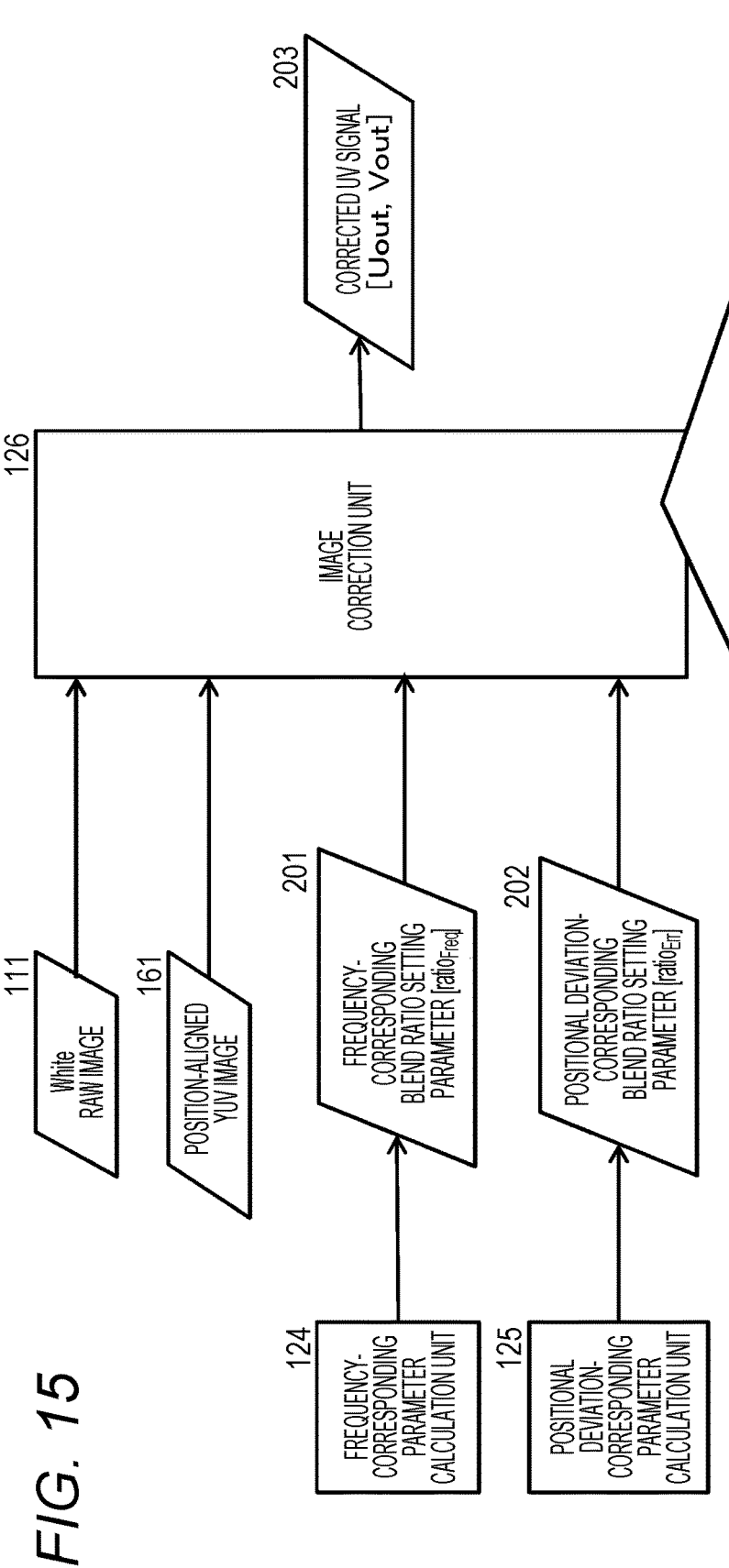

FIG. 16

(a) CALCULATION FORMULAS FOR CORRECTED UV SIGNAL $$U_{out} = (1 - ratio_{Err})((1 - ratio_{Freq}) \times U_0 + ratio_{Freq} \times U_1) + ratio_{Err} \times U_2$$

$$V_{out} = (1 - ratio_{Err})((1 - ratio_{Freq}) \times V_0 + ratio_{Freq} \times V_1) + ratio_{Err} \times V_2$$

(b) CALCULATION FORMULAS FOR LPF-APPLIED UV VALUE $$U_n = LPF_n(U) \times \frac{W}{LPF_n(W)}$$

$$V_n = LPF_n(V) \times \frac{W}{LPF_n(W)}$$

(c) DESCRIPTION OF LOW-PASS FILTERS

UV IMAGES TO WHICH THREE TYPES OF FILTERS ARE APPLIED ARE GENERATED.

$U_0 = LPF_0(U)$    $U_1 = LPF_1(U)$    $U_2 = LPF_2(U)$
$V_0 = LPF_0(V)$    $V_1 = LPF_1(V)$    $V_2 = LPF_2(V)$

THREE FILTERS ARE DISTINGUISHED FROM EACH OTHER BY VARIATION IN CUTOFF FREQUENCY, WHERE LPF$_0$ IS HIGHEST AND LPF$_2$ IS LOWEST. FOR EXAMPLE, LPF$_0$ IS MOVING AVERAGE FILTER OF 3×3, LPF$_1$ IS MOVING AVERAGE FILTER OF 13×13, AND LPF$_2$ IS MOVING AVERAGE FILTER OF 25×25.

FILTER COEFFICIENT SETTING EXAMPLE FOR MOVING AVERAGE FILTER OF 3×3 (KERNEL)

$$kernel = \begin{bmatrix} \frac{1}{9} & \frac{1}{9} & \frac{1}{9} \\ \frac{1}{9} & \frac{1}{9} & \frac{1}{9} \\ \frac{1}{9} & \frac{1}{9} & \frac{1}{9} \end{bmatrix}$$

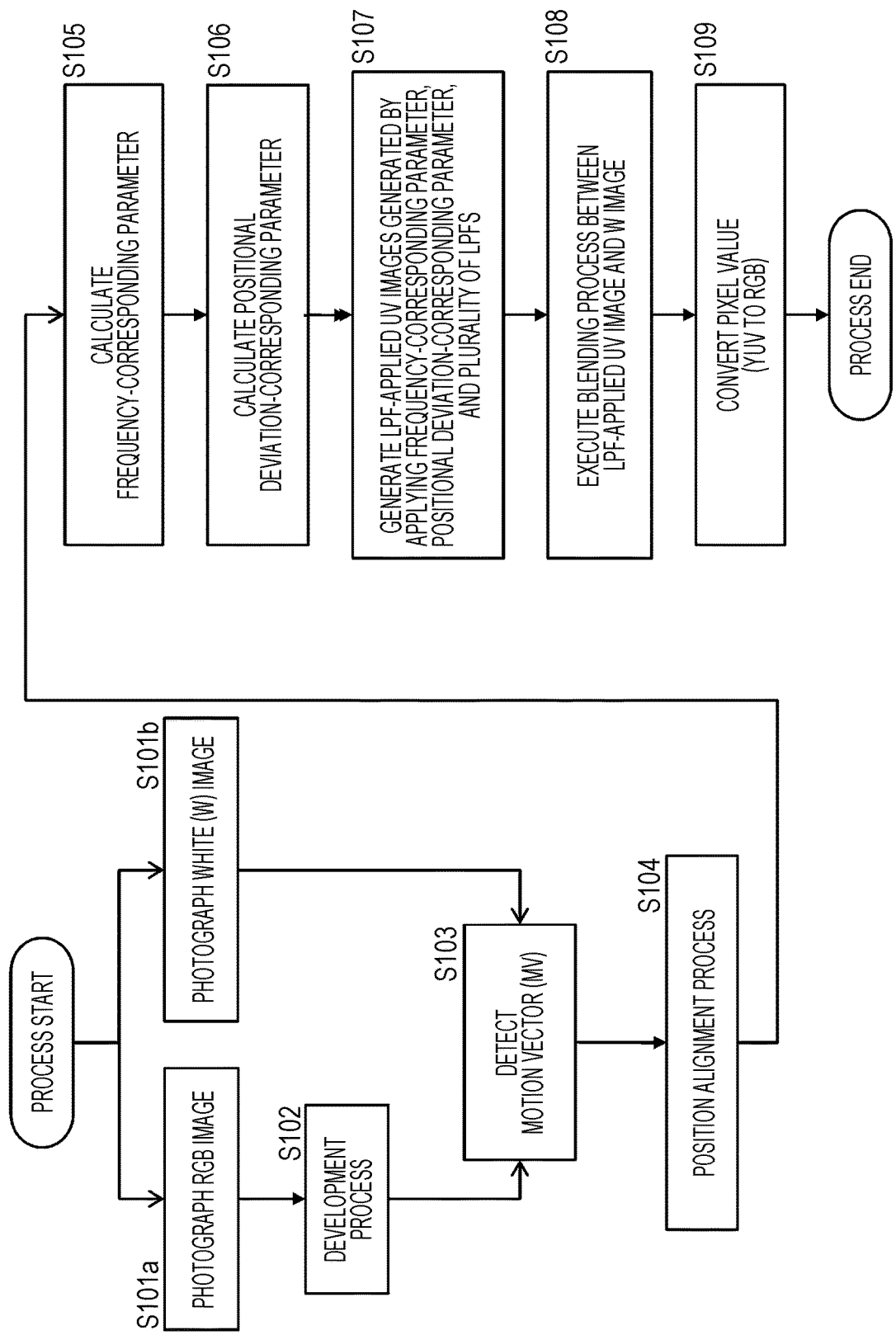

IMAGE PROCESSING APPARATUS, IMAGING APPARATUS, IMAGE PROCESSING METHOD, AND PROGRAM

CROSS REFERENCE TO PRIOR APPLICATION

This application is a National Stage Patent Application of PCT International Patent Application No. PCT/JP2016/086062 (filed on Dec. 5, 2016) under 35 U.S.C. § 371, which claims priority to Japanese Patent Application No. 2016-045224 (filed on Mar. 9, 2016), which are all hereby incorporated by reference in their entirety.

TECHNICAL FIELD

The present disclosure relates to an image processing apparatus, an imaging apparatus, an image processing method, and a program. More particularly, the present disclosure relates to an image processing apparatus, an imaging apparatus, an image processing method, and a program that execute a correction process for a false color that occurs in an image.

BACKGROUND ART

When a color image is photographed by a camera (imaging apparatus), a color different from the actual color of a photographed subject, a so-called false color, occurs in a photographed image in some cases.

For example, a color filter constituted by an RGB array is provided in an imaging element such that incident light via the color filter reaches the imaging element and an electric signal according to the amount of each ray of the incident light is output.

In such an imaging configuration using the color filter, the false color is likely to occur in a so-called high frequency signal region in which, for example, the amount of change in luminance or color signal per unit area is large. Particularly in the case of an imaging element with a high density, the false color tends to occur more easily.

For example Patent Document 1 (Japanese Patent Application Laid-Open No. 2013-26672) is cited as a prior art that discloses a correction technique for such a false color.

Patent Document 1 discloses a configuration that executes a color correction using two photographed images using two imaging elements, namely, an imaging element (image sensor) having an RGB pixel array for photographing a general color image, for example, a Bayer array, and an imaging element constituted by a white (W) pixel array including only W pixels.

However, the photographed image obtained by the imaging element (image sensor) having the RGB pixel array contains a region in which the false color is likely to occur and a region in which the false color rarely occurs. Thus, these regions need to be discriminated such that an optimal process is performed in units of regions. Otherwise, it is impossible to reproduce the accurate color of the subject.

In addition, in order to use the two images of the RGB image and the W image, photographing with the two imaging elements placed side by side is necessary and thus a positional deviation based on parallax occurs in the two images.

In order to accurately perform the above-described correction in units of regions, it is necessary to first execute position alignment for eliminating the positional deviation between the two images and then detect image characteristics in units of regions such that an optimal correction is performed in units of regions.

The above-mentioned Patent Document 1 describes a false color correction using photographed images by two imaging elements, namely, an imaging element (image sensor) having the RGB array and an imaging element (image sensor) having the white (W) pixel array. However, there is no detailed explanation for optimizing the correction approach on the basis of the features of each image region and there is a possibility that an erroneous correction is performed depending on the image region.

CITATION LIST

Patent Document

Patent Document 1: Japanese Patent Application Laid-Open No. 2013-26672

SUMMARY OF THE INVENTION

Problems to be Solved by the Invention

The present disclosure has been made in view of the above difficulties and it is an object of the present disclosure to provide an image processing apparatus, an imaging apparatus, an image processing method, and a program that use two images photographed using an imaging element for photographing an ordinary color image, such as an RGB array imaging element, and an imaging element having a white (W) pixel array, to optimize a correction approach in accordance with characteristics in units of image regions and generate a high quality image in which false colors are decreased by an optimal image correction according to image characteristics of each image region.

Solutions to Problems

A first aspect of the present disclosure is an image processing apparatus including an image processor that receives inputs of a color image and a white X image photographed by a W array imaging element whose all pixels are placed in a white (W) pixel array, and executes an image process that reduces false colors included in the color image, in which the image processor includes a frequency-corresponding parameter calculation unit that receives an input of the white (W) image and calculates a frequency-corresponding parameter of the white (W) image in units of image regions;

a positional deviation-corresponding parameter calculation unit that receives inputs of the white X image and the color image and calculates a positional deviation-corresponding parameter of the two input images in units of image regions; and an image correction unit that executes a blending process in which a blend rate between the white (W) image and the color image is controlled in accordance with values of the frequency-corresponding parameter and the positional deviation-corresponding parameter and calculates a corrected pixel value.

Furthermore, a second aspect of the present disclosure is an imaging apparatus including:

a first imaging unit that has a W array imaging element whose all pixels are placed in a white (W) pixel array and photographs a white (W) image;

a second imaging unit that has an RGB array imaging element having an RGB pixel array and photographs a color image; and an image processor that receives inputs of the white (W) image and the color image and executes an image process that reduces false colors included in the color image, in which the image processor includes:

a frequency-corresponding parameter calculation unit that receives an input of the white (W) image and calculates a frequency-corresponding parameter of the white (W) image in units of image regions;

a positional deviation-corresponding parameter calculation unit that receives inputs of the white (W) image and the color image and calculates a positional deviation-corresponding parameter of the two input images in units of image regions; and an image correction unit that executes a blending process in which a blend rate between the white (W) image and the color image is controlled in accordance with values of the frequency-corresponding parameter and the positional deviation-corresponding parameter and calculates a corrected pixel value.

Furthermore, a third aspect of the present disclosure is an image processing method executed in an image processing apparatus, the image processing apparatus including an image processor that receives inputs of a color image and a white (W) image photographed by a W array imaging element whose all pixels are placed in a white (W) pixel array, and executes an image process that reduces false colors included in the color image, the image processing method including calculating, by the image processor, a corrected pixel value by executing:

a frequency-corresponding parameter calculation process of receiving an input of the white (W) image and calculating a frequency-corresponding parameter of the white (W) image in units of image regions;

a positional deviation-corresponding parameter calculation process of receiving inputs of the white (W) image and the color image and calculating a positional deviation-corresponding parameter of the two input images in units of image regions; and a blending process in which a blend rate between the white (W) image and the color image is controlled in accordance with values of the frequency-corresponding parameter and the positional deviation-corresponding parameter.

Furthermore, a fourth aspect of the present disclosure is an image processing method executed in an imaging apparatus, the imaging apparatus including:

a first imaging unit that has a W array imaging element whose all pixels are placed in a white (W) pixel array and photographs a white (W) image;

a second imaging unit that has an RGB array imaging element having an RGB pixel array and photographs a color image; and an image processor that receives inputs of the white (W) image and the color image and executes an image process that reduces false colors included in the color image, the image processing method including:

photographing, by the first imaging unit and the second imaging unit, the white (W) image and the color image; and calculating, by the image processor, a corrected pixel value by executing:

a frequency-corresponding parameter calculation process of receiving an input of the white (W) image and calculating a frequency-corresponding parameter of the white (W) image in units of image regions;

a positional deviation-corresponding parameter calculation process of receiving inputs of the white (W) image and the color image and calculating a positional deviation-corresponding parameter of the two input images in units of image regions; and a blending process in which a blend rate between the white (W) image and the color image is controlled in accordance with values of the frequency-corresponding parameter and the positional deviation-corresponding parameter.

Furthermore, a fifth aspect of the present disclosure is a program that causes an image processing apparatus to execute an image process, the image processing apparatus including an image processor that receives inputs of a color image and a white (W) image photographed by a W array imaging element whose all pixels are placed in a white (W) pixel array, and executes an image process that reduces false colors included in the color image, the program causing the image processor to execute a process of calculating a corrected pixel value by executing:

a frequency-corresponding parameter calculation process of receiving an input of the white (W) image and calculating a frequency-corresponding parameter of the white (W) image in units of image regions;

a positional deviation-corresponding parameter calculation process of receiving inputs of the white (W) image and the color image and calculating a positional deviation-corresponding parameter of the two input images in units of image regions; and a blending process in which a blend rate between the white (W) image and the color image is controlled in accordance with values of the frequency-corresponding parameter and the positional deviation-corresponding parameter.

Furthermore, a sixth aspect of the present disclosure is a program that causes an imaging apparatus to execute an image process, the imaging apparatus including:

a first imaging unit that has a W array imaging element whose all pixels are placed in a white (W) pixel array and photographs a white (W) image;

a second imaging unit that has an RGB array imaging element having an RGB pixel array and photographs a color image; and an image processor that receives inputs of the white (W) image and the color image and executes an image process that reduces false colors included in the color image, the program causing:

the first imaging unit and the second imaging unit to photograph the white (W) image and the color image; and the image processor to execute a process of calculating a corrected pixel value by executing:

a frequency-corresponding parameter calculation process of receiving an input of the white (W) image and calculating a frequency-corresponding parameter of the white (W) image in units of image regions;

a positional deviation-corresponding parameter calculation process of receiving inputs of the white (W) image and the color image and calculating a positional deviation-corresponding parameter of the two input images in units of image regions; and a blending process in which a blend rate between the white (W) image and the color image is controlled in accordance with values of the frequency-corresponding parameter and the positional deviation-corresponding parameter.

Note that the programs of the present disclosure are programs that can be provided by a storage medium or a communication medium configured to provide a program in a computer readable format, for example, to an information processing apparatus or a computer system capable of executing a variety of program codes. By providing such programs in a computer readable format, processes according to the programs are implemented on the information processing apparatus or the computer system.

Still another object, feature, and advantage of the present disclosure will be made clear through more detailed description based on the embodiments of the present disclosure mentioned below and the accompanying drawings. In addition, in the present description, the term "system" refers to a logical group configuration of a plurality of apparatuses and is not limited to a system in which apparatuses having respective configurations are accommodated in the same housing.

Effects of the Invention

According to the configuration of an embodiment of the present disclosure, an apparatus and a method that perform a false color correction according to image characteristics of a color image in units of image regions are implemented.

Specifically, included therein is an image processor that receives inputs of a color image and a white (W) image photographed by a W array imaging element whose all pixels are placed in a white (W) pixel array and executes an image process that reduces false colors included in the color image. Together with a frequency-corresponding parameter calculation unit that receives an input of the white (W) image and calculates a frequency-corresponding parameter in units of image regions, and a positional deviation-corresponding parameter calculation unit that receives inputs of the white (W) image and the color image and calculates a positional deviation-corresponding parameter of the two input images in units of image regions, the image processor executes a blending process in which a blend rate between the white (W) image and the color image is controlled in accordance with values of the frequency-corresponding parameter and the positional deviation-corresponding parameter and calculates a corrected pixel values.

Through these processes, an apparatus and a method that perform a false color correction according to image characteristics of the color image in units of image regions are implemented and it becomes possible to generate and output a high quality image in which false colors are removed or reduced.

Note that the effects described in the present description merely serve as examples and not construed to be restricted. There may be an additional effect as well.

BRIEF DESCRIPTION OF DRAWINGS

FIG. 2 is a diagram for explaining configuration examples of a pixel array of an imaging apparatus.
FIG. 5 is a diagram for explaining a configuration and a process of the frequency-corresponding parameter calculation unit.
FIG. 12 is a diagram for explaining a process executed by the image correction unit.
FIG. 13 is a diagram for explaining a process executed by the image correction unit.
FIG. 14 is a diagram for explaining a process executed by the image correction unit.
FIG. 15 is a diagram for explaining a process executed by the image correction unit.
FIG. 16 is a diagram for explaining a process executed by the image correction unit.
FIG. 18 is a diagram illustrating a flowchart for explaining a sequence of a process executed by the image processing apparatus.

MODE FOR CARRYING OUT THE INVENTION

Hereinafter, details of an image processing apparatus, an imaging apparatus, an image processing method, and a program of the present disclosure will be described with reference to the drawings. Note that the explanation will be made in line with the following items.
1. About Configuration and Process of Image Processing Apparatus of Present Disclosure
2. About Configuration of image Processor and False Color Reduction Process
3. About Image Process according to Image Characteristics Executed by Image Correction Unit
4. About image Process using Plurality of Different Lowpass Filters Combined in accordance with Image Characteristics
5. About Processing Sequence of Image Process Executed by image Processing Apparatus
6. Other Configuration Examples of Image Processing Apparatus
7. Summary of Configuration of Present Disclosure

[1. About Configuration and Process of Image Processing Apparatus of Present Disclosure]

A configuration and a process of an image processing apparatus of the present disclosure will be described with reference to FIG. 1 and the following drawings.

Figure 1:
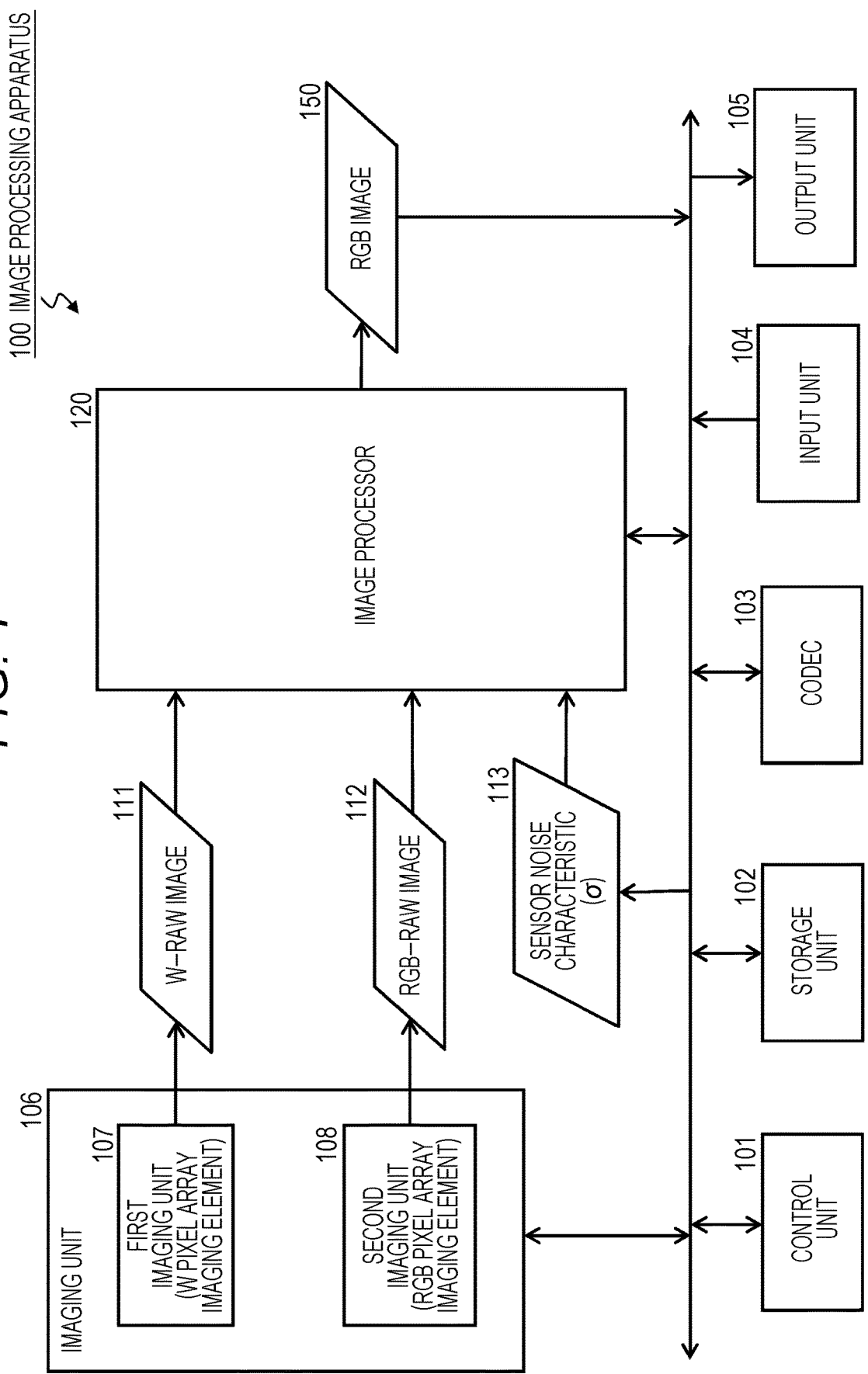
FIG. 1 is a diagram for explaining a configuration example of an image processing apparatus.

FIG. 1 is a block diagram illustrating a configuration of an imaging apparatus which is an example of the image processing apparatus 100 of the present disclosure.

Note that the image processing apparatus according to the present disclosure is not limited to the imaging apparatus, but also includes an information processing apparatus such as a personal computer (PC) that, for example, receives an input of a photographed image by the imaging apparatus to execute an image process.

In the following, a configuration and a process of the imaging apparatus will be described as an example of the image processing apparatus 100 of the present disclosure.

An image process other than a photographing process described in the following embodiments is not limited to the imaging apparatus, but can be executed in an information processing apparatus such as a PC.

The image processing apparatus 100 as the imaging apparatus illustrated in FIG. 1 has a control unit 101, a storage unit 102, a codec 103, an input unit 104, an output unit 105, an imaging unit 106, and an image processor 120.

The imaging unit 106 includes a first imaging unit 107 having a white (W) pixel array imaging element that outputs an electric signal based on the amount of incident light in an entire wavelength region of visible light, and a second imaging unit 108 having an RGB pixel array imaging element that has an RGB color filter, for example, a color filter constituted by a Bayer array, and outputs a signal corresponding to input light of each RGB color in units of pixels.

The first imaging unit 107 and the second imaging unit 108 serve as two imaging units set at positions a predetermined interval apart from each other and the photographed images by the respective units are obtained as images from different viewpoints. In a case where these two images are still images, the images are photographed as still images at the same timing. In a case where the images are moving images, frames photographed by the respective imaging units are obtained as frames photographed in synchronization with each other, that is, continuous image frames sequentially photographed at the same timing.

Note that these photographing timings are controlled by the control unit 101.

However, as described above, these two imaging units 107 and 108 serve as two imaging units set at positions a predetermined interval apart from each other and the photographed images by the respective units are obtained as images from different viewpoints. That is, the images are obtained as images having parallax.

Therefore, the same subject image is not photographed at corresponding pixels of the two images, that is, pixels at the same position, and a subject deviation according to parallax occurs.

In the image processing apparatus 100 according to the present disclosure, the image processor 120 performs an image correction by taking this deviation into account, specifically, an image process that reduces false colors. Details of this process will be described later.

The control unit 101 controls various processes executed in the imaging apparatus 100, such as image photographing, a signal process on a photographed image, a recording process for an image, and a display process. The control unit 101 is equipped with a central processing unit (CPU) or the like that, for example, executes a process in line with a variety of processing programs saved in the storage unit 102 and functions as a data processor that executes the programs.

The storage unit 102 includes a random access memory (RAM), a read only memory (ROM), and the like which function as not only a saving unit for photographed images but also a storage unit for a processing program executed by the control unit 101 and various parameters and additionally function as a work area at the time of data processing.

The codec 103 executes encoding and decoding processes such as compression and decompression processes for the photographed image.

The input unit 104 is, for example, a user operation unit and receives an input of control information such as photographing start and end and a variety of mode settings.

The output unit 105 includes a display unit, a speaker, and the like and is used, for example, for display of the photographed image, a live view image, and the like and audio output.

The image processor 120 receives inputs of not only two images input from the imaging unit 106, namely, a white-RAW (W-RAW) image 111 and a RGB-RAW image 112, but also a sensor noise characteristic (σ) 113 as a processing parameter and executes an image process that decreases false colors to generate and output an RGB image 150.

As described above, the imaging unit 106 includes the first imaging unit 107 having the white (W) pixel array imaging element that outputs an electric signal based on the amount of incident light in the entire wavelength region of visible light, and the second imaging unit 108 having the RGB pixel array imaging element that has the RGB color filter, for example, a color filter constituted by the Bayer array, and outputs a signal corresponding to input light of each RGB color in units of pixels.

Figure 2:
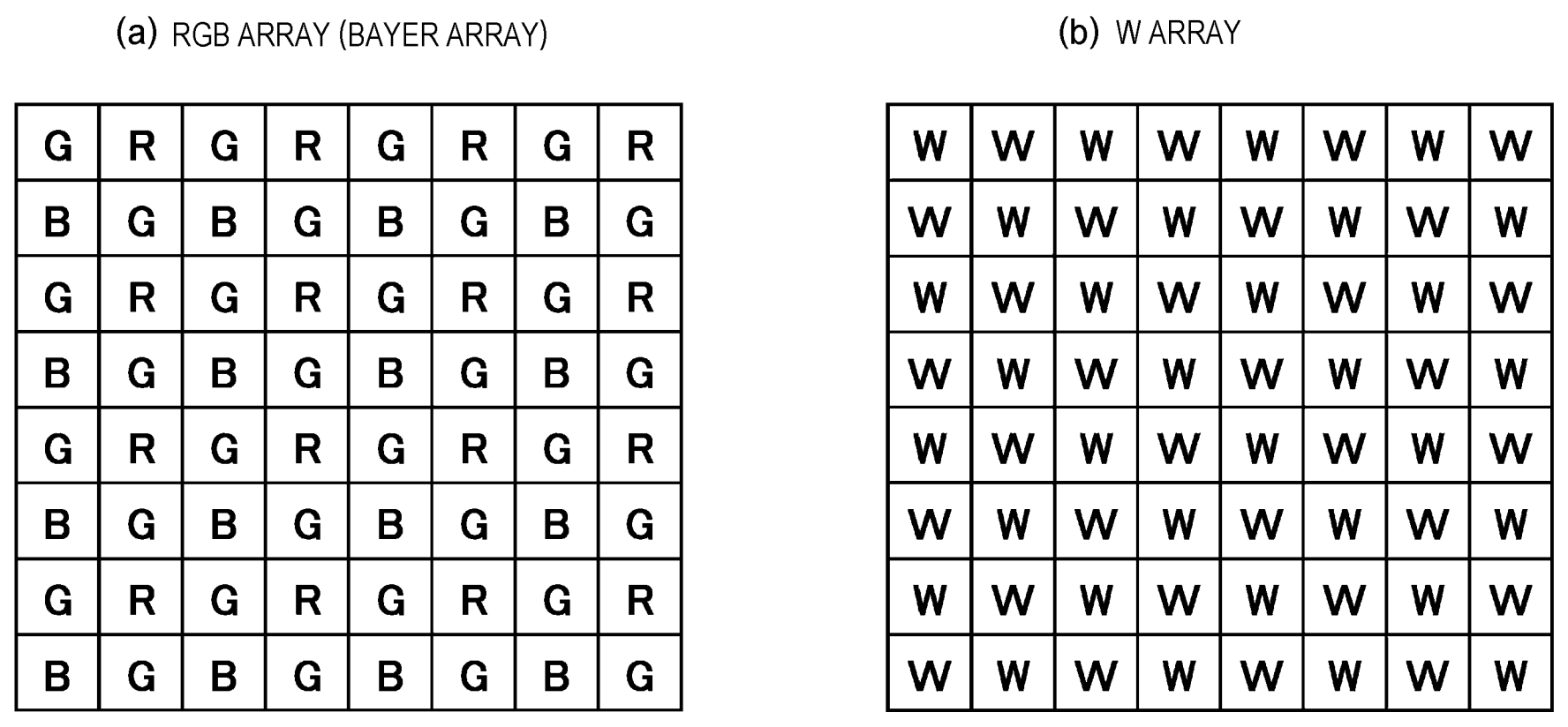

The pixel arrays (filter arrays) of these two imaging units 107 and 108 will be described with reference to FIG. 2.

FIG. 2(a) illustrates a Bayer array used for photographing a general color image.

The Bayer array includes an RGB filter that selectively transmits light of wavelength of each RGB color.

Two G pixels are set on the diagonal of 4 pixels made up of 2×2 pixels and one R pixel and one B pixel are separately arranged in the remaining spaces.

This Bayer array type RGB pixel array is a pixel array used for the second imaging unit 108 illustrated in FIG. 1. One of RGB pixel values is set in units of pixels through the image photographing process. This image before the signal process is the RGB-RAW image 112 illustrated in FIG. 1.

In the RGB-RAW image, any one pixel value out of R, G, and B is set for each pixel. A process of setting three RGB signals to all pixels is performed through a demosaic process executed as the subsequent signal process.

In an ordinary monocular camera, a color image is generated by such a process but, when such a process is performed, as described earlier, a false color in which a color that is not present in the original subject appears in an output image occurs during this process in some cases.

In the image processing apparatus of the present disclosure, a process that decreases such false colors is performed by an image process in the image processor 120 illustrated in FIG. 1.

A specific process of this process will be described later.

FIG. 2(b) is a diagram illustrating a pixel array (filter array) of the first imaging unit 107 in FIG. 1. All the pixels are constituted by a white (W) pixel that outputs an electric signal based on the amount of incident light in the entire wavelength region of visible light.

The first imaging unit 107 in FIG. 1 generates the W-RAW image 111 as a picked-up image by the W pixel array imaging element in which W pixels that receive incident light of all the wavelengths of RGB are arrayed for all the pixels at all pixel positions and inputs the generated W-RAW image 111 to the image processor 120.

The image processor 120 receives an input of the W-RAW image 111 from the first imaging unit 107 and an input of the RGB-RAW image 112 from the second imaging unit 108 and additionally receives an input of the sensor noise characteristic ($\sigma$) 113 which is a parameter applied to a correction process that decreases the false colors, to perform an image correction process for decreasing the false colors.

Note that the sensor noise characteristic ($\sigma$) 113 is a noise characteristic of the imaging elements used in the first imaging unit 107 and the second imaging unit 108 of the imaging unit 106 and, for example, is acquired in advance by the control unit 101 to be saved in the storage unit 102.

In addition, although the noise characteristic of the imaging elements used in the first imaging unit 107 and the second imaging unit 108 is indicated here as a common value ($\sigma$), a configuration using separate characteristics $\sigma1$ and $\sigma2$ of the imaging elements of the respective imaging units may be adopted.

[2. About Configuration of Image Processor and False Color Reduction Process]

Next, a configuration and a process of the image processor 120 of the image processing apparatus 100 illustrated in FIG. 1 will be described with reference to FIG. 3 and the following drawings.

Figure 3:
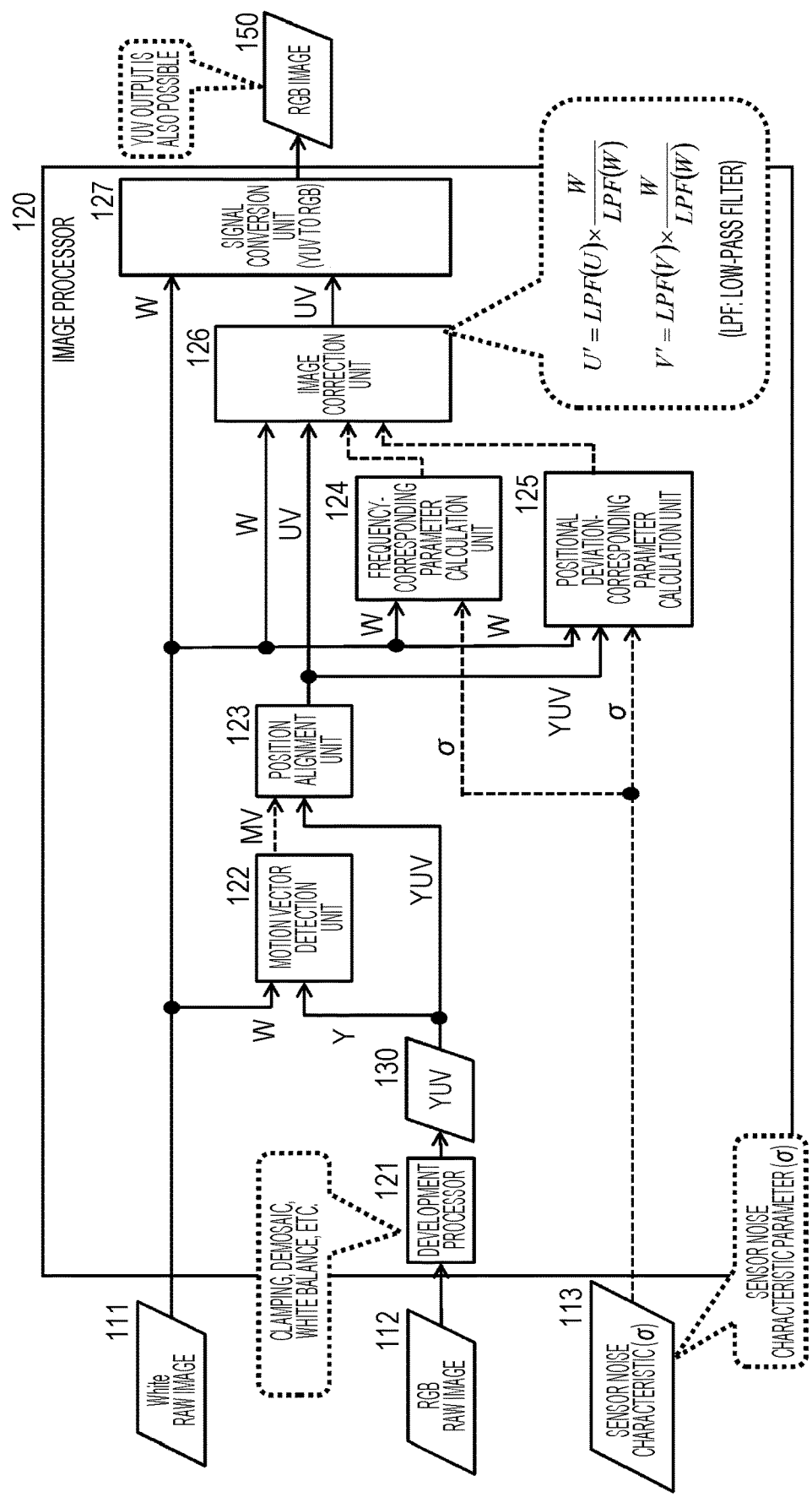
FIG. 3 is a diagram for explaining a configuration and a process of an image processor.

FIG. 3 is a block diagram illustrating a configuration of the image processor 120 of the image processing apparatus 100.

As illustrated in FIG. 3, the image processor 120 has a development processor 121, a motion vector detection unit 122, a position alignment unit 123, a frequency-corresponding parameter calculation unit 124, a positional deviation-corresponding parameter 125, an image correction unit 126, and a signal conversion unit 127.

The image processor 120 executes a process of reducing the false colors occurring in the RGB image which is a photographed image by the second imaging unit 108 illustrated in FIG. 1, and outputs the RGB image 150 with reduced false colors.

Input signals to the image processor 120 are the following respective signals:

(1) the W image 111 input from the first imaging unit 107;
(2) the RGB-RAW image 112 input from the second imaging unit 108; and
(3) the sensor noise characteristic ($\sigma$) 113.

First, the development processor 121 executes a development process on the RGB-RAW image 112 input from the second imaging unit 108. Specifically, for example, the following processes are executed:

(a) a clamping process of removing a direct current (DC) offset occurring on the basis of a circuit constituting the imaging element or an offset component based on a noise signal;
(b) a demosaic process of setting three RGB signals to respective pixels on the basis of RGB single signal values set for each pixel of the RGB-RAW image;
(c) a white balance process of regulating RGB values with respect to a white subject; and
(d) a conversion process on the RGB values to YUV values.

These processes are executed.

Note that all of these processes can be executed by applying existing technologies.

The RGB-RAW image 112 is converted into a YUV image 130 through the development process by the development processor 121.

The YUV image 130 is an image in which three pixel values, namely, luminance (Y), chrominance (U), and chrominance (V) are set for all the pixels.

Next, the process of the motion vector (RV) detection unit 122 will be described.

The motion vector detection unit 122 receives an input of the W image 111 from the first imaging unit 107 and also receives an input of a Y signal (luminance signal) of the YUV image 130 generated by the development processor 121 on the basis of the RGB-RAW image 112 which is a photographed image by the second imaging unit 108.

On the basis of these two signals (a W signal and the Y signal), the motion vector detection unit 122 detects a motion vector (MV) representing a positional deviation between the two images.

As described earlier, the first imaging unit 107 and the second imaging unit 108, which are included in the imaging unit 106 of the image processing apparatus 100 illustrated in FIG. 1, serve as two imaging units set at positions a predetermined interval apart from each other and the photographed images by the respective units are obtained as images from different viewpoints. That is, the images are obtained as images having parallax.

Therefore, the same subject image is not photographed at corresponding pixels of the two images, that is, pixels at the same position, and a subject deviation according to parallax occurs.

On the basis of these two signals (the W signal and the Y signal), the motion vector detection unit 122 detects a motion vector (MV) representing a positional deviation between the two images.

Specifically, corresponding points of two images (a W image and a Y image) are found and a vector connecting these corresponding points is calculated as a motion vector (MV).

The motion vector (MV) generated by the motion vector detection unit 122 is input to the position alignment unit 123.

The position alignment unit 123 receives an input of the motion vector am generated by the motion vector detection unit 122 and also receives an input of the YUV image 130 generated by the development processor 121 on the basis of the RGB-RAW image 112.

The position alignment unit 123 moves each pixel position in the YUV image 130 in line with the size and direction of the motion vector (MV) to generate the W image, that is, a YUV image similar to an image photographed from the same viewpoint position as that of the W-RAW image 111 which is a photographed image key the first imaging unit 107.

Through this process, the YUV image 130 is converted into a YUV image that is regarded as photographed from the same viewpoint as that of the first imaging unit 107.

The YUV image after the position alignment process generated by the position alignment unit 123 is input to the positional deviation-corresponding parameter calculation unit 125.

Additionally, a chrominance signal UV is input to the image correction unit 126.

Next, a process of the frequency-corresponding parameter calculation unit 124 will be described.

The frequency-corresponding parameter calculation unit 124 receives inputs of the W-RAW image 111, which is a photographed image by the first imaging unit 107, and the sensor noise characteristic ($\sigma$) 113 and, on the basis of these pieces of input data, calculates a frequency-corresponding blend ratio setting parameter, which is a correction parameter for use in false color correction, to output to the image correction unit 126.

Note that the sensor noise characteristic (σ) 113 is noise characteristic information on the imaging element used in the first imaging unit 107 of the imaging unit 106, specifically, data indicating the intensity of noise included in an output signal from the imaging element used in the first imaging unit 107.

For example, this sensor noise characteristic (σ) 113 is acquired in advance by the control unit 101 to be saved in the storage unit 102 and acquired from the storage unit 102 under the control of the control unit 101 to be input to the frequency-corresponding parameter calculation unit 124.

The specific configuration and process of the frequency-corresponding parameter calculation unit 124 will be described with reference to FIGS. 4 and 5.

Figure 4:
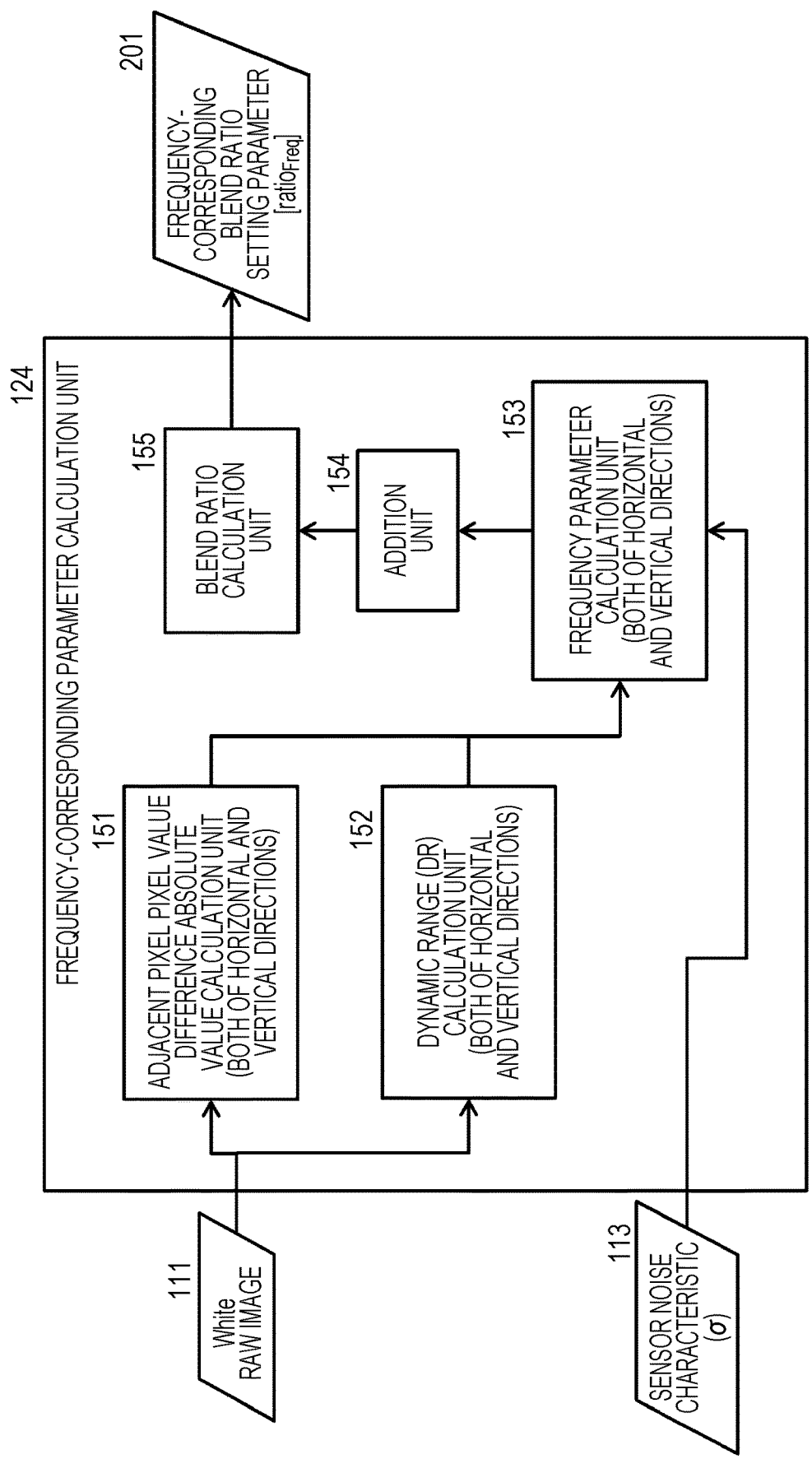
FIG. 4 is a diagram for explaining a configuration and a process of a frequency-corresponding parameter calculation unit.

FIG. 4 is a diagram illustrating a specific configuration of the frequency-corresponding parameter calculation unit 124.

As illustrated in FIG. 4, the frequency-corresponding parameter calculation unit 124 receives inputs of the W-RAW image 111, which is a photographed image by the first imaging unit 107, and the sensor noise characteristic (σ) 113 and, on the basis of these pieces of input data, calculates a frequency-corresponding blend ratio setting parameter, which is a correction parameter for use in false color correction, to output to the image correction unit 126.

As illustrated in FIG. 4, the frequency-corresponding parameter calculation unit 124 has an adjacent pixel pixel pixel value difference absolute value calculation unit 151, a dynamic range (DR) calculation unit 152, a frequency parameter calculation unit 153, an addition unit 154, and a blend ratio calculation unit 155.

A specific process of each of these processors will be described with reference to FIG. 5.

FIG. 5(a) is a diagram for explaining a setting example of a calculation region for the frequency-corresponding blend ratio setting parameter to be calculated by the frequency-corresponding parameter calculation unit 124.

The frequency-corresponding blend ratio setting parameter calculated by the frequency-corresponding parameter calculation unit 124 is a parameter corresponding to each pixel.

The parameter calculation process is executed using the W-RAW image 111 which is a photographed image by the first imaging unit 107. Assuming that a parameter calculation target pixel is a pixel at a position (x, y), a calculation process for the parameter is executed using the pixel values of a surrounding pixel region of this parameter calculation target pixel (x, y).

The example illustrated in FIG. 5(a) is an example in which, as a surrounding pixel region of the parameter calculation target pixel (x, y), a pixel region of 9×9 pixels with the parameter calculation target pixel (x, y) as the center pixel is designated as a pixel region to be applied to the parameter calculation.

Note that a variety of settings can be made for the size of this pixel region.

FIG. 5(b) illustrates a specific procedure of the parameter calculation process by the frequency-corresponding parameter calculation unit 124.

The calculation process for the frequency-corresponding blend ratio setting parameter by the frequency-corresponding parameter calculation unit 124 is performed in line with the following procedure (steps S01 to S03).

(Step S01)

The processes in steps S01 and S02 are processes executed by the adjacent pixel pixel pixel value difference absolute value calculation unit 151, the dynamic range (DR) calculation unit 152, and the frequency parameter calculation unit 153 illustrated in FIG. 4.

First, in step S01, a frequency parameter (activity) $[act_{HOR}]$ in a horizontal direction is calculated.

This process is a process using the pixel values of pixels in the horizontal direction included in the parameter calculation region centered on the parameter calculation target pixel (x, y).

In the setting example of the parameter calculation region illustrated in FIG. 5(a), the frequency parameter (activity) $[act_{HOR}]$ in the horizontal direction is calculated using the pixel values of nine pixels in total, made up of the parameter calculation target pixel (x, y), four pixels on the left side of the parameter calculation target pixel (x, y), and four pixels on the right side thereof.

The calculation of the frequency parameter (activity) $[act_{HOR}]$ in the horizontal direction is executed in line with following (Formula 1).

[Mathematical Formula 1]

$$act_{HOR} = \sum_i |W_{x-i,y} - W_{x-i+1,y}| \qquad \text{(Formula 1)}$$

Note that (Formula 1) above is a formula for calculating the horizontal frequency parameter (activity) $[act_{HOR}]$ of the pixel position (x, y) in the W-RAW image 111 which is a photographed image by the first imaging unit 107.

In (Formula 1) above, $W_{x-i,y}$ denotes the pixel value of a pixel position (x−i, y) in the W-RAW image 111 and $W_{x-i+1,y}$ denotes the pixel value of a pixel position (x−1+1, y) in the W-RAW image 111.

A variable indicating a pixel position coordinate) in the parameter calculation region is denoted by i and, in the case of the setting in FIG. 4(a), i=4 to −4 is established.

Note that the parameter may be set to be adjusted by taking into account the dynamic range (DR), the sensor noise characteristic (σ) 113, that is, the intensity of noise of the imaging element of the first imaging unit 107, and the like.

Above-mentioned (Formula 1) is a formula for calculating a value obtained by, in a case where the region setting illustrated in FIG. 4(a) is employed, adding difference absolute values between the adjacent pixel values of nine pixels, namely, the pixel values $W_{x-4,y}$ to $W_{x+4,y}$ of nine pixels located in the horizontal direction of the parameter calculation target pixel (x, y), and dividing the resultant value by the dynamic ranges (DR) of the nine pixels, such that the obtained value is adopted as the frequency parameter (activity) $[act_{Hold}]$ of the pixel position (x, y) in the horizontal direction.

(Step S02)

Next, a frequency parameter (activity) $[act_{VER}]$ in a vertical direction is calculated.

This process is a process using the pixel values of pixels in the vertical direction included in the parameter calculation region centered on the parameter calculation target pixel (x, y).

In the setting example of the parameter calculation region illustrated in FIG. 4(a), the frequency parameter (activity) $[act_{VER}]$ in the vertical direction is calculated using the pixel values of nine pixels in total, made up of the parameter calculation target pixel (x, y), four pixels on the upper side of the parameter calculation target pixel (x, y), and four pixels on the lower side thereof.

The calculation of the frequency parameter (activity) [$act_{VER}$] in the vertical direction is executed in line with following (Formula 2).

[Mathematical Formula 2]

$$act_{VER} = \sum_i |W_{x,y-i} - W_{x,y-i+1}| \qquad \text{(Formula 2)}$$

Note that (Formula 2) above is a formula for calculating the vertical frequency parameter (activity) [$act_{VER}$] of the pixel position (x, y) in the W-RAW image 111 which is a photographed image by the first imaging unit 107.

In (Formula 2) above, $W_{x,y-i}$ denotes the pixel value of a pixel position (x, y−i) in the W-RAW image 111 and $W_{x,y-i+1}$ denotes the pixel value of a pixel position (x, y−i+1) in the W-RAW image 111.

A variable indicating a pixel position (y coordinate) is the parameter calculation region is denoted by i and, in the case of the setting in FIG. 4(*a*), i=4 to −4 is established.

Note that the parameter may be set to be adjusted by taking into account the dynamic range (DR), the sensor noise characteristic (σ) 113, that is, the intensity of noise of the imaging element of the first imaging unit 107, and the like.

Above-mentioned (Formula 2) is a formula for calculating a value obtained by, in a case where the region setting illustrated in FIG. 4(*a*) is employed, adding difference absolute values between the adjacent pixel values of nine pixels, namely, the pixel values $W_{x,y-4}$ to $W_{x,y+4}$ of nine pixels located in the vertical direction of the parameter calculation target pixel (x, y), and dividing the resultant value by the dynamic ranges (DR) of the nine pixels, such that the obtained value is adopted as the frequency parameter (activity) [$act_{VER}$] of the pixel position (x, y) in the vertical direction.

(Step S03)

The process in step S03 is a process executed by the addition unit 154 and the blend ratio calculation unit 155 illustrated in FIG. 4.

In step S03, the following process is executed

Using the parameters in the two directions, namely, the frequency parameter (activity) [$act_{HOR}$] in the horizontal direction calculated in above step S01 and the frequency parameter (activity) [$act_{VER}$] in the vertical direction calculated in above step S02, the frequency-corresponding blend ratio setting parameter [$ratio_{Freq}$] is calculated in line with following (Formula 3).

[Mathematical Formula 3]

$$act = act_{HOR} + act_{VER} \qquad \text{(Formula 3)}$$
$$ratio_{Freq} = \frac{1}{\alpha} \text{MIN}(act, \alpha)$$

Note that, in above (Formula 3),

α a denotes a predefined parameter calculation coefficient and, for example, the maximum value of the values of act calculated by following formula is designated as α.

$$act = act_{HOR} + act_{VER}$$

An addition value (act) of the frequency parameter (activity) [$act_{HOR}$] in the horizontal direction and the frequency parameter (activity) [$act_{VER}$] in the vertical direction or the parameter calculation coefficient (α), whichever value is smaller, is selected and this selected value is divided by the parameter calculation coefficient (α), such that the obtained value is calculated as the frequency-corresponding blend ratio setting parameter [$ratio_{Freq}$] of the pixel position (x, y).

Note that, for example, α=2 can be used as an example of the parameter calculation coefficient (α).

The frequency-corresponding blend ratio setting parameter [$ratio_{Freq}$] calculated in line with above (Formula 3) is obtained as a value in the range of 0 to 1.

The frequency-corresponding blend ratio setting parameter [$ratio_{Freq}$] becomes:

a larger value, that is, a value close to one in a high frequency region where the pixel value finely changes; and a smaller value, that is, a value close to zero in a flat image region where a change in pixel value is small, that is, in a low frequency region.

The frequency-corresponding parameter calculation unit 124 calculates the frequency-corresponding blend ratio setting parameter [$ratio_{Freq}$] in line with the above-described process.

Note that the frequency-corresponding parameter calculation unit 124 calculates the frequency-corresponding blend ratio setting parameter [$ratio_{Freq}$] for all the pixels constituting the W-RAW image 111 which is a photographed image by the first imaging unit 107.

The calculated parameters are input to the image correction unit 126.

Next, a configuration and a process of the positional deviation-corresponding parameter calculation unit 125 illustrated in FIG. 3 will be described.

The positional deviation-corresponding parameter calculation unit 125 illustrated in FIG. 3 receives inputs of the W-RAW image 111, which is a photographed image by the first imaging unit 107, the YUV image after position alignment generated by the position alignment unit 123, that is, a YUV image equivalent to an image photographed from the photographing viewpoint of the first imaging unit 107, and the sensor noise characteristic (π) 113 and, on the basis of these pieces of input data, calculates a positional deviation-corresponding blend ratio setting parameter, which is a correction parameter for use in false color correction, to output to the mage correction unit 126.

Note that the sensor noise characteristic (σ) 113 is noise characteristic information on the imaging element used in the second imaging unit 108 of the imaging unit 106, specifically, data indicating the intensity of noise included in an output, signal from the imaging element used in the second imaging unit 108.

For example, this sensor noise characteristic (σ) 113 is acquired in advance by the control unit 101 to be saved in the storage unit 102 and acquired from the storage unit 102 under the control of the control unit 101 to be input to the positional deviation-corresponding parameter calculation unit 125.

The specific configuration and process of the positional deviation-corresponding parameter calculation unit 125 will be described with reference to FIG. 6.

Figure 6:
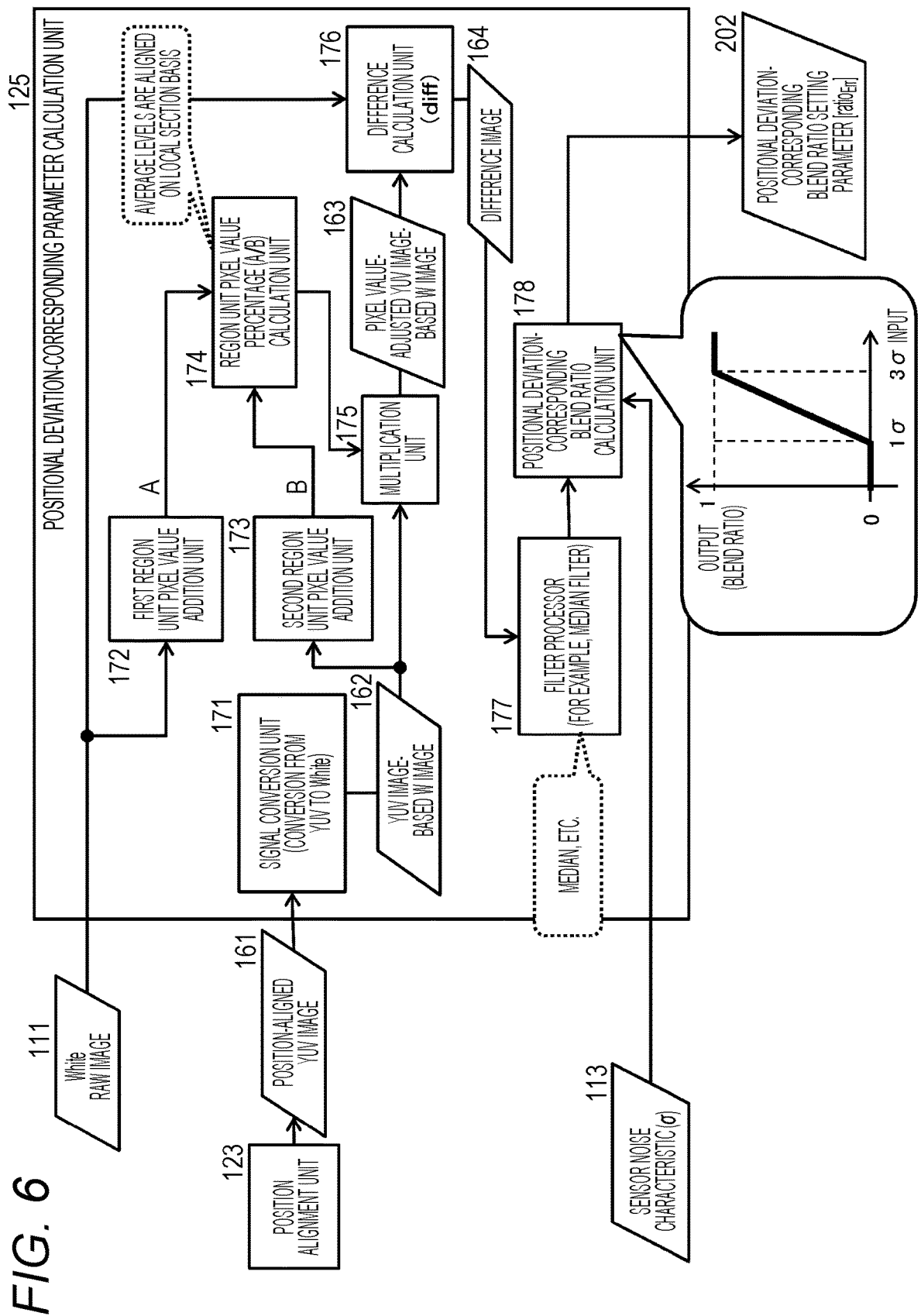
FIG. 6 is a diagram for explaining a configuration and a process of a positional deviation-corresponding parameter calculation unit.

As illustrated in FIG. 6, the positional deviation-corresponding parameter calculation unit 125 receives inputs of the W-RAW image 111, which is a photographed image by the first imaging unit 107, a position-aligned YUV image 161 generated by the position alignment unit 123, that is, a position-aligned YUV image 161 equivalent to an image photographed from the photographing viewpoint of the first imaging unit 107, and the sensor noise characteristic (σ) 113 and, on the basis of these pieces of input data, calculates a positional deviation-corresponding blend ratio setting parameter 202, which is a correction parameter for use in false color correction, to output to the image correction unit 126.

First, a signal conversion unit 171 of the positional deviation-corresponding parameter calculation unit 125 executes a signal conversion process of converting a YUV signal of each pixel of the position-aligned YUV image 161 into a white (W) signal.

Figure 7:
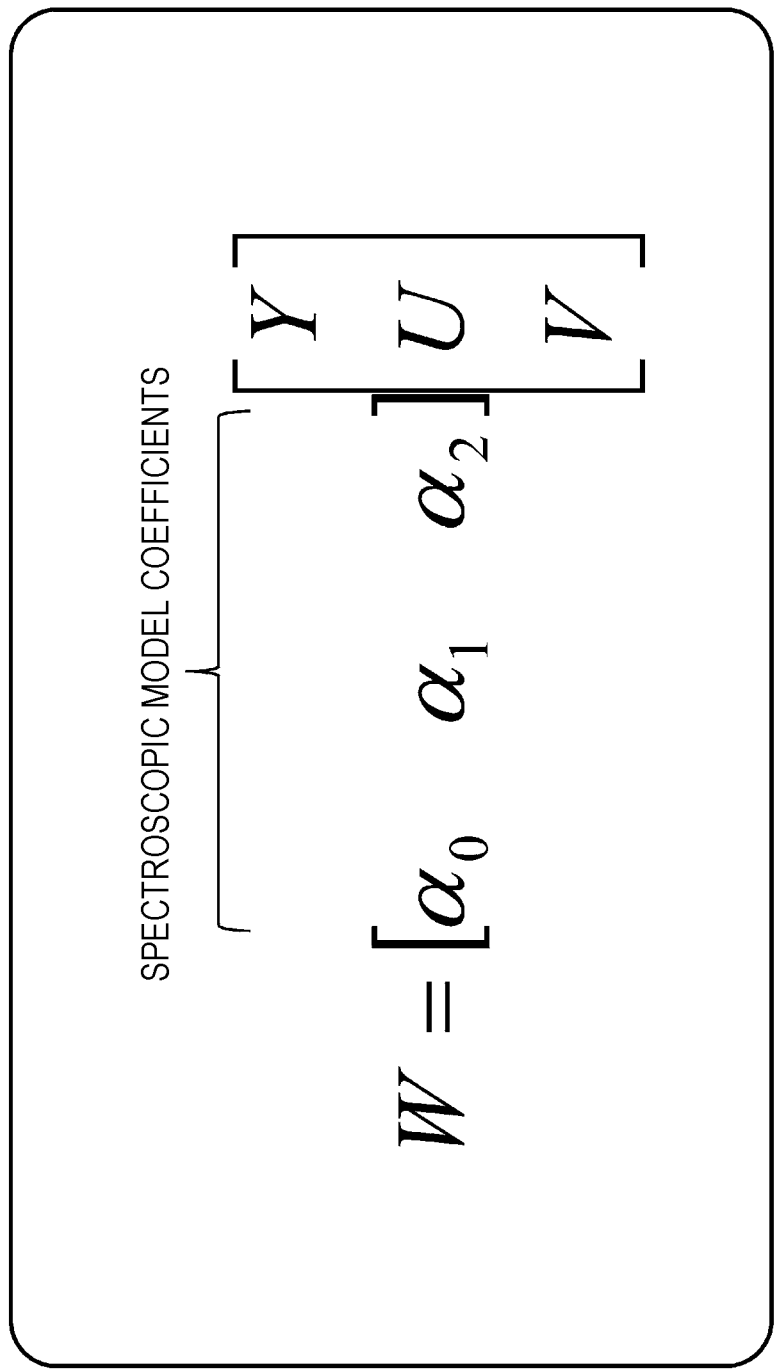
FIG. 7 is a diagram for explaining a configuration and a process of the positional deviation-corresponding parameter calculation unit.

Specifically, the YUV signal is converted into the white (W) signal in line with a formula illustrated in FIG. 7, that is, the following formula (Formula 4).

[Mathematical Formula 4]

$$W = \frac{Spectroscopic\ Model\ Coefficients}{[\alpha_0\ \alpha_1\ \alpha_2]} \begin{bmatrix} Y \\ U \\ V \end{bmatrix} \quad \text{(Formula 4)}$$

Note that, in above (Formula 4), $\alpha_0$, $\alpha_1$, and $\alpha_2$ denote spectroscopic model coefficients, which are predefined conversion parameters.

A YUV image-based W image 162 generated by the signal conversion unit 171 on the basis of the position-aligned YUV image 161 is output to a second region unit pixel value addition unit 173 and a multiplication unit 175.

The second region unit pixel value addition unit 173 executes a pixel value addition process on the YUV image-based W image 162 in units of predefined pixel regions (n×n pixels, where n is, for example, 3, 5, 7, 9, or the like) and outputs an added pixel value (B) that has been calculated to a region unit pixel value percentage (A/B) calculation unit 174.

Meanwhile, a first region unit pixel value addition unit 172 executes a pixel value addition process on the W-RAW image 111, which is a photographed image by the first imaging unit 107, in units of the same pixel region as the pixel region applied by the second region unit pixel value addition unit 173 (n×n pixels, for example, n is 9) and outputs an added pixel value (A) that has been calculated to the region unit pixel value percentage (A/B) calculation unit 174.

The region unit pixel value percentage (A/B) calculation unit 174 calculates a region unit added pixel value percentage (A/B) between the region unit added pixel value (A) of the W-RAW image 111 and the region unit added pixel value (B) of the YUV image-based W image 162 to output to the multiplication unit 175.

The multiplication unit 175 receives inputs of the YUV image-based W image 162 generated by the signal conversion unit 171 on the basis of the position-aligned YUV image 161 and the region unit added pixel value percentage (A/B) calculated by the region unit pixel value percentage (A/B) calculation unit 174.

The multiplication unit 175 executes a process of multiplying the pixel values of constituent pixels of the YUV image-based N image 162 by the region unit added pixel value percentage (A/B) to convert the pixel values.

Note that the multiplication process is executed by combining the region unit added pixel value percentages (A/B) of the regions including the positions of the respective pixels.

This multiplication process is executed as a process of aligning the pixel value level of the YUV image-based W image 162 to the pixel value level of the W pixel of the W-RAW image 111 which is a photographed image by the first imaging unit 107.

The multiplication unit 175 generates a pixel value-adjusted YUV image-based W image 163 through this level adjustment to output to a difference calculation unit 176.

The N pixel value of the pixel value-adjusted YUV image-based N image 163 becomes substantially the same as the pixel value of the N pixel of the N-RAN image 111, which is a photographed image by the first imaging unit 107, in a pixel region where no false color occurs.

However, in a region where a false color occurs, a difference occurs between the W pixel value of the pixel value-adjusted YUV image-based W image 163 and the pixel value of the H pixel of the H-RAW image 111.

The difference calculation unit 176 detects this difference (diff).

The difference calculation unit 176 receives inputs of the W-RAW image 111 which is a photographed image by the first imaging unit 107 and the pixel value-adjusted YUV image-based W image 163 which is an output of the multiplication unit 175 and calculates a difference between the pixel values of the corresponding pixels of these two images located at the positions having the same coordinates.

A difference image 164 including the calculated difference value corresponding to each pixel is input to a filter processor 177.

The filter processor 177 receives an input of the difference image 164 in which a difference value between pixel values of the W-RAW image 111 and the pixel value-adjusted YUV image-based H image 163 is set in each pixel, and performs a filtering process on this difference image in units of predetermined regions (for example, n×n pixels, n=3, 5, 7, 9, or the like). The applied filter is, for example, a median filter that acquires a median value of pixel values of a predetermined pixel region to designate as a new pixel value.

A filtering result image of the difference image 164 including the difference pixel values is input to a positional deviation-corresponding blend ratio calculation unit 178.

The blend ratio calculation unit 178 calculates the positional deviation-corresponding blend ratio setting parameter (ratio$_{ERR}$)) 202 on the basis of each pixel value (difference pixel value after filtering) of the filtering result image of the difference image 164 including the difference pixel values to output to the image correction unit 126.

Figure 8:
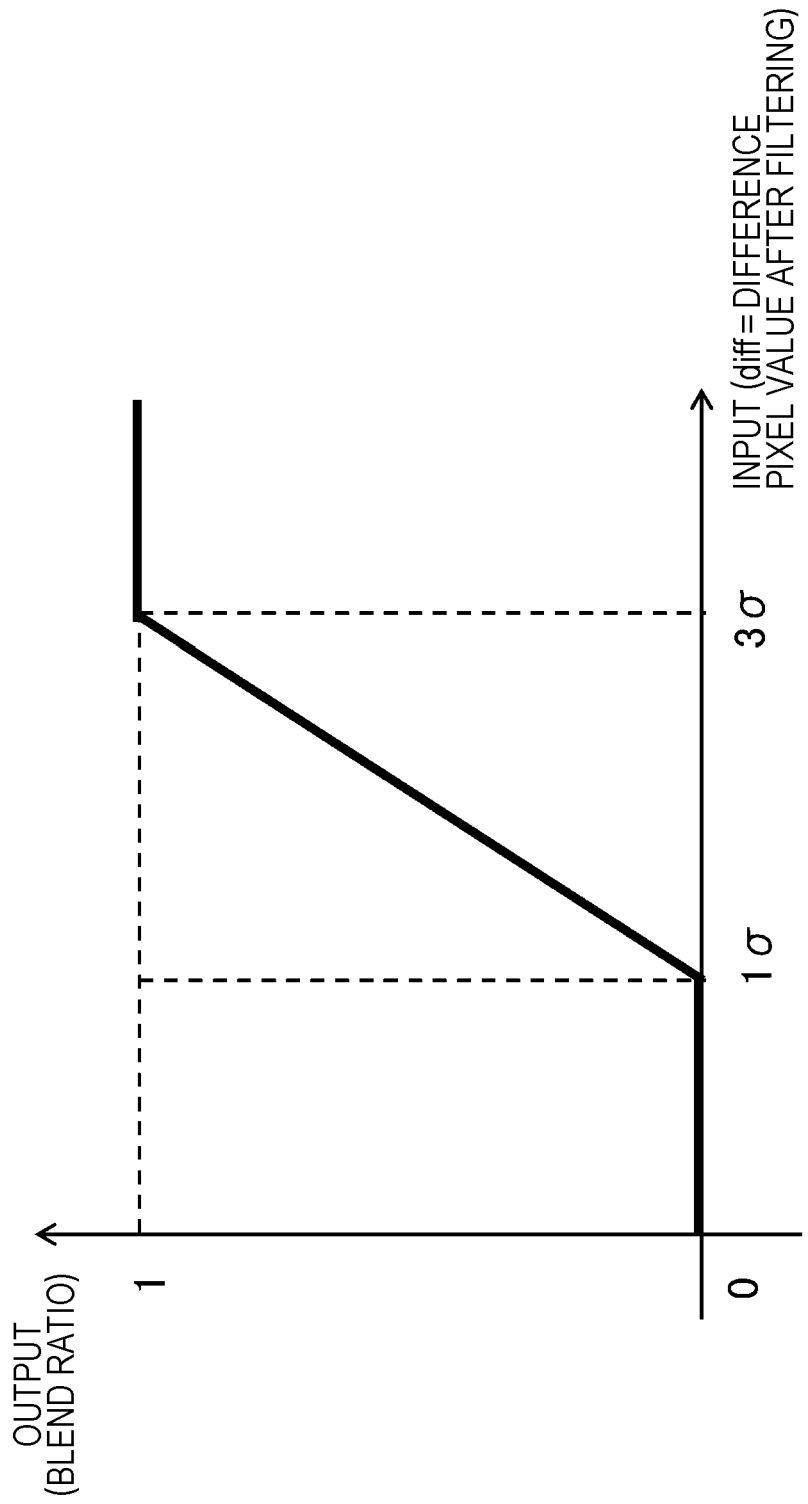
FIG. 8 is a diagram for explaining a configuration and a process of the positional deviation-corresponding parameter calculation unit.

FIG. 8 illustrates an example of a graph indicating the correspondence relationship between "each pixel value (difference pixel value after filtering) of the filtering result image of the difference image 164 including the difference pixel values" input to the blend ratio calculation unit 178 and "the positional deviation-corresponding blend ratio setting parameter (ratio$_{ERR}$) 202" output by the blend ratio calculation unit 178.

In the graph illustrated in FIG. 8, the abscissa axis indicates "each pixel value (difference pixel value after filtering) of the filtering result image of the difference image 164 including the difference pixel values" as an input value, and the ordinate axis indicates "the positional deviation-corresponding blend ratio setting parameter (ratio$_{ERR}$) 202" as an output value.

The graph illustrated in FIG. 8 is an example indicating the correspondence relationship between the input and output values and the output value is defined as follows using threshold values 1σ and 3σ set in advance:

(a) in the case of input value <σ, the output value indicating the blend ratio=0 is in effect;

(b) in the case of σ≤input value <3σ, the output value is set to be increased in proportion to the input value within the range of the output value indicating the blend ratio=0 to 1; and (c) in the case of 3σ input value, the output value indicating the blend ratio=1 is in effect.

The blend ratio calculation unit 178 calculates the output value, that is, "the positional deviation-corresponding blend ratio setting parameter (ratio$_{ERR}$) 202" on the basis of the value of "each pixel value (difference pixel value after filtering) of the filtering result image of the difference image 164 including the difference pixel values", which is an input value, in line with, for example, the input/output correspondence relationship defining data illustrated in FIG. 8 and outputs the calculated value to the image correction unit 126.

Note that the positional deviation-corresponding blend ratio setting parameter [ratio$_{ERR}$] calculated by the blend ratio calculation unit 178 is obtained as a value in the range of 0 to 1.

The positional deviation-corresponding blend ratio setting parameter [ratio$_{Err}$] becomes a larger value, that is, a value close to one in a pixel region where the positional deviation is large (=there are many false colors); and a smaller value, that is, a value close to zero in a pixel region where the positional deviation is small (=there are few false colors).

Note that, basically, the W-RAW image 111 and the pixel value-adjusted YUV image-based N image 163 are images after position alignment and properly, the positional deviation should be eliminated. However, a difference occurs in each pixel value (W pixel value) depending on the pixel position. This difference is thought to be a false color and is described as a "positional deviation-corresponding parameter" under the interpretation that the pixel with such a difference is a pixel that should be output to a pixel position different from the pixel position of the original pixel value.

Therefore, "large positional deviation" represents "many false colors" and "small positional deviation" represents "few false colors".

In addition, the example of the correspondence relationship between the input and output values illustrated in FIG. 8 is an example and a variety of other settings can be made.

[3. About Image Process according to Image Characteristics Executed by Image Correction Unit]

Next, a process of the image correction unit 126 of the image processor 120 illustrated in FIG. 3 will be described with reference to FIG. 9 and the following drawings.

Figure 9:
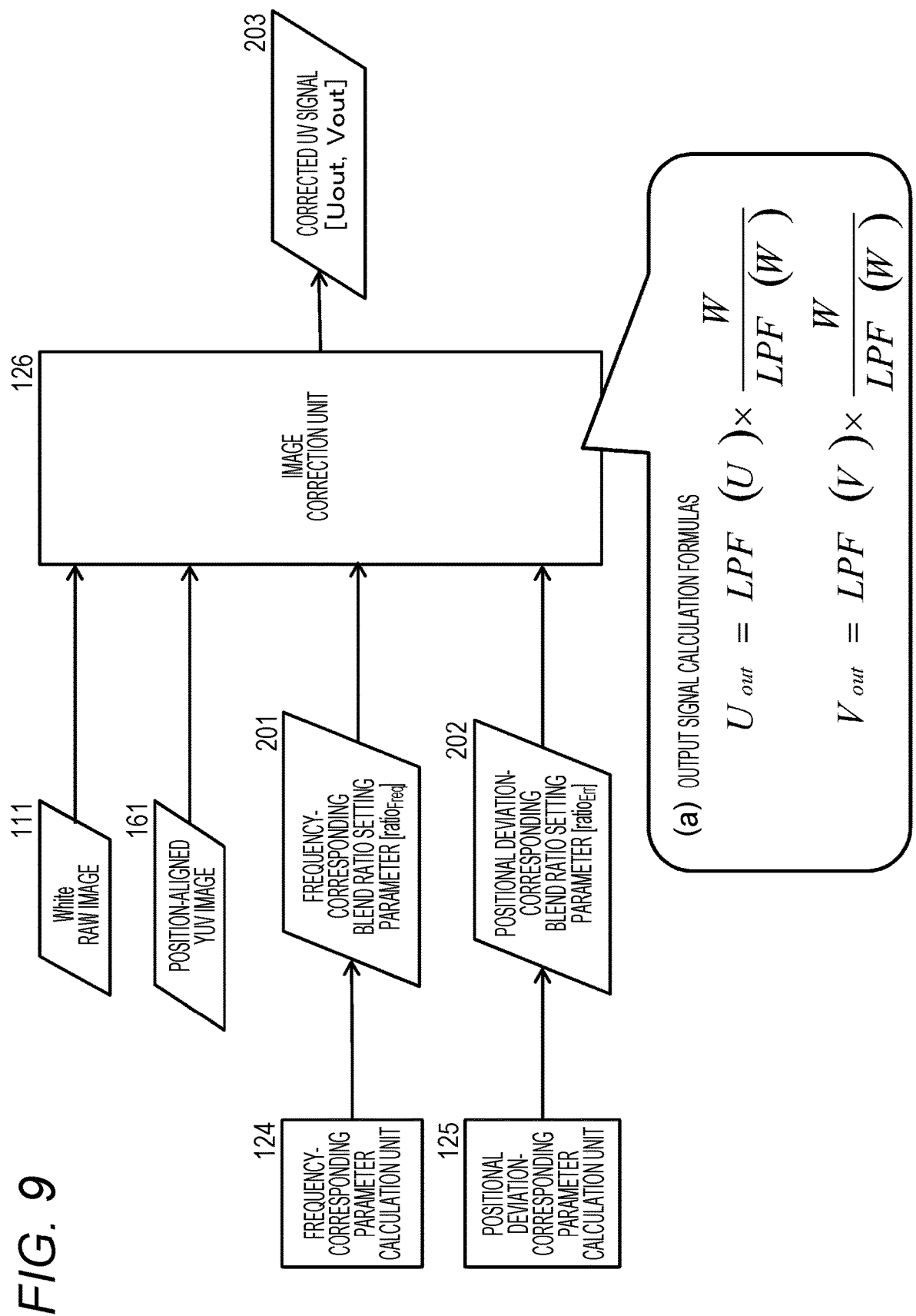
FIG. 9 is a diagram for explaining a configuration and a process of an image correction unit.

As illustrated in FIG. 9, the image correction unit 126 receives inputs of the following respective pieces of data:

(a) the W-RAW image 111 which is a photographed image by the first imaging unit 107;

(b) the position-aligned YUV image 161 generated by the position alignment unit 123;

(c) the frequency-corresponding blend ratio setting parameter [ratio$_{Freq}$] generated by the frequency-corresponding parameter calculation unit 124; and (d) the positional deviation-corresponding blend ratio setting parameter [ratio$_{Err}$] generated by the positional deviation-corresponding parameter calculation unit 125.

The image correction unit 126 receives inputs of these pieces of data and generates a corrected UV signal (Uout, Vout) 203, which is as output signal value of the chrominance signal UV constituting the pixel value of the corrected image (YUV image) in which false colors have been reduced, to output to the signal conversion unit 127 in the image processor 120 illustrated in FIG. 3.

The image correction unit 126 generates the corrected UV signal (Uout, Vout), for example, in line with the output signal calculation formulas illustrated in FIG. 9(a).

[Mathematical Formula 5]

$$U_{out} = LPF(U) \times \frac{W}{LPF(W)} \quad \text{(Formula 5)}$$
$$V_{out} = LPF(V) \times \frac{W}{LPF(W)}$$

LPF illustrated in above (Formula 5) stands for a low-pass filter.

LPF(U) indicates a low-pass filter application process to a pixel value signal U of the position-aligned YUV image 161 generated by the position alignment unit 123.

LPF(V) indicates a low-pass filter application process to a pixel value signal V of the position-aligned YUV image 161 generated by the position alignment unit 123.

LPF(W) indicates a low-pass filter application process to a pixel value signal W of the W-RAW image 111 which is a photographed image by the first imaging unit 107.

Specifically, above (Formula 5) indicates, for example, formulas for executing the following pixel value correction process.

For example, "LPF(U)" illustrated in the calculation formula for a corrected U signal (Uout) in (Formula 5) applies a low-pass filter to the pixel signal U of the YUV image 161 and smooths the false color pixel value with the pixel values of the surrounding pixels to reduce false colors.

However, this smoothing causes a "blur" in the image. In order to eliminate this blur, a pixel value signal W of the W-RAW image 111 which is a photographed image by the first imaging unit 107 is blended. That is, the "blur" in the image is eliminated by the multiplication by "W/LPF(W)".

The calculation formula for a corrected V signal (Vout) in (Formula 5) works in a similar manner and "LPF(V)" applies a low-pass filter to the pixel signal V of the YUV image 161 and smooths the false color pixel value with the pixel values of the surrounding pixels to reduce false colors.

However, this smoothing causes a "blur" in the image. In order to eliminate this blur, the pixel value W of the W-RAW image 111 which is a photographed image by the first imaging unit 107 is blended. That is, the "blur" in the image is eliminated by the multiplication by "W/LPF(W)".

Note that the output signal calculation formulas in FIG. 9(a) and the formulas illustrated in (Formula 5) indicate that a blending process on the two images, namely, (1) the position-aligned YUV image 161 generated by the position alignment unit 123, and (2) the W-RAW image 111 which is a photographed image by the first imaging unit 107 is performed during the calculation process for the corrected UV signal (Uout, Vout) 203 by the image correction unit 126.

As a practical process, the low-pass filter (LPF) included in the formulas illustrated in (Formula 5) is switched in accordance with the image characteristics to calculate the corrected. UV signal (Uout, Vout) 203.

When calculating the corrected UV signal (Uout, Vout) 203, the image correction unit 126 employs a different blend ratio, that is, alters the blend ratio between the position-aligned YUV image 161 and the W-RAW image 111 in accordance with characteristics in units of image regions, namely, (1) frequency characteristics, and (2) positional deviation characteristics to calculate the final corrected UV signal (Uout, Vout) 203.

The parameters that determine these blend ratios are the following parameters:

(1) the frequency-corresponding blend ratio setting parameter [$ratio_{Freq}$] generated by the frequency-corresponding parameter calculation unit 124; and (2) the positional deviation-corresponding blend ratio setting parameter [$ratio_{Err}$] generated by the positional deviation-corresponding parameter calculation unit 125.

Prior to describing a specific process example using these parameters, how the image correction unit 126 sets the blend ratio between the position-aligned YUV image 161 and the W-RAW image ill in accordance with the image characteristics in units of image regions will be described with reference to FIG. 10.

Figure 10:
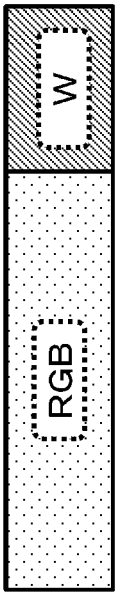
FIG. 10 is a diagram for explaining a process executed by the image correction unit.

In FIG. 10, the following respective pieces of data are illustrated in association with each other.

(a) Characteristics of image region (b) Blend ratio setting example for an RGB sensor output image and a W sensor output image Note that the RGB sensor output image illustrated in (b) represents the position-aligned YUV image 161 and the W sensor output image illustrated therein represents the W-RAW image 111.

FIG. 10 exemplifies the following representative image region characteristics of three types ((1) to (3)).

(1) Frequency=low range, positional deviation=small (2) Frequency=high range, positional deviation=small (3) Frequency=low range to wide range, positional deviation=large (1) Frequency=low range, positional deviation=small The image region having these image characteristics is a low frequency region, that is, a flat image region with little change in pixel value and at the same time, is the image region with the positional deviation=small, that is, an image region where the "positional deviation" in which a pixel value other than the pixel value corresponding to the original pixel position is output (=estimated as the occurrence of false color) is small.

For the image region having such image characteristics, as illustrated in the column (1) (b) in FIG. 10, the blend ratio of the RGB sensor output image (position-aligned YUV image 161) is set to be high and the blend ratio of the W sensor output image (W-RAW image 111) is set to be small.

The corrected UV signal (Uout, Vout) 203 is calculated by the blending process in line with the blend ratio with such a setting.

(2) Frequency=high range, positional deviation=small

The image region having these image characteristics is a high frequency region, that is, an image region where the pixel value drastically changes and at the same time, is the image region with the positional deviation=small, that is, an image region where the "positional deviation" in which a pixel value other than the pixel value corresponding to the original pixel position is output (=estimated as the occurrence of false color) is small.

For the image region having such image characteristics, as illustrated in the column (2) (b) in FIG. 10, the blend ratio of the RGB sensor output image (position-aligned YUV image 161) and the blend ratio of the W sensor output image (W-RAW image 111) are made substantially equal to each other.

The corrected UV signal (Uout, Vout) 203 is calculated by the blending process in line with the blend ratio with such a setting.

(3) Frequency=low range to wide range, positional deviation=large

The image region having these image characteristics is a low frequency region to a high frequency region, that is, a variety of frequency regions from a flat image region with little change in pixel value to a high frequency region, that is, an image region where the pixel value drastically changes and at the same time, is the image region with the positional deviation=large, that is, an image region where the "positional deviation" in which a pixel value other than the pixel value corresponding to the original pixel position is output (=estimated as the occurrence of false color) is large.

For the image region having such image characteristics, as illustrated in the column (3) (b) in FIG. 10, the blend ratio of the RGB sensor output image (position-aligned YUV image 161) is set to be small and the blend ratio of the W sensor output image (W-RAW image 111) is set to be large.

The corrected UV signal (Uout, Vout) 203 is calculated by the blending process in line with the blend ratio with such a setting.

As an example of a specific process for implementing the blending process for the position-aligned YUV image 161 and the W-RAW image 111 with the blend ratio according to the image characteristics as illustrated in FIG. 10, it is effective to perform a process of switching the low-pass filter (LPF) to be applied to the formulas illustrated in FIG. 9(a) described above, that is, the output signal calculation formulas indicated as above-mentioned (Formula 5) in accordance with the image characteristics.

An example of the process of switching the low-pass filter (LPT) to be applied to the output signal calculation formulas indicated as above-mentioned (Formula 5) in accordance with the image characteristics will be described with reference to FIG. 11.

Figure 11:
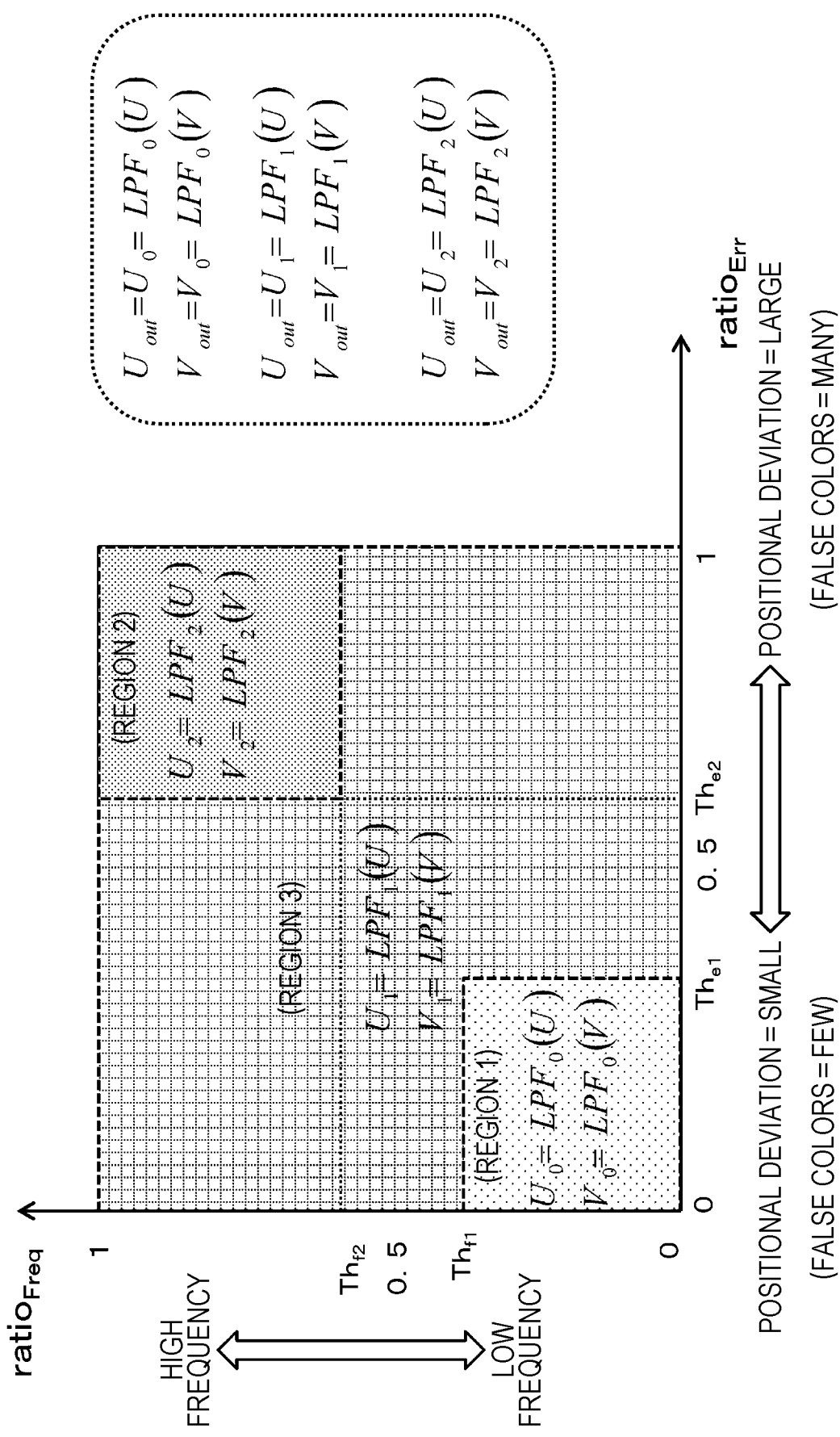
FIG. 11 is a diagram for explaining a process executed by the image correction unit.

The process example illustrated in FIG. 11 is a diagram for explaining a process example of switching the low-pass filter (LP F) to be applied to the output signal calculation formulas indicated as above-mentioned (Formula 5) in accordance with the image characteristics, that is, the values of parameters, namely, (1) the frequency-corresponding blend ratio setting parameter [$ratio_{Freq}$] generated by the frequency-corresponding parameter calculation unit 124, and (2) the positional deviation-corresponding blend ratio setting parameter [$ratio_{Err}$] generated by the positional deviation-corresponding parameter calculation unit 125.

FIG. 11 illustrates an application example of three types of different low-pass filters (LPFs) to be used in accordance with the value of each parameter by setting respective axes in such a manner that the positional deviation-corresponding blend ratio setting parameter [$ratio_{Err}$] generated by the positional deviation-corresponding parameter calculation unit 125 is set to the abscissa axis and the frequency-corresponding blend ratio setting parameter [$ratio_{Freq}$] generated by the frequency-corresponding parameter calculation unit 124 is set to the ordinate axis.

The three low-pass filters ($LPF_0$ to $LPF_2$) are distinguished from each other by variation in cutoff frequency, where the cutoff frequency of $LPF_0$ is the highest and the cutoff frequency of $LPF_2$ is the lowest.

For example, low-pass filters with the following settings can be applied as the respective low-pass filters:

LPF$_0$ is a moving average filter of 3×3 (pixels);
LPF$_1$ is a moving average filter of 13×13 (pixels); and
LPF$_2$ is a moving average filter of 25×25 (pixels).

The moving average filters having such settings can be applied as the above three low-pass filters (LPF$_0$ to LPF$_2$).

Note that the moving average filter carries out a process of calculating the average pixel value of all the pixels in the pixel region (n×n, n=3, 13, 25, and the like) centered on the correction target pixel and setting this calculated pixel value as the corrected pixel value.

For example, the coefficient setting of the moving average filter of 3×3 is set as illustrated in following (Formula 6).

[Mathematical Formula 6]

$$\text{kernel} = \begin{bmatrix} \frac{1}{9} & \frac{1}{9} & \frac{1}{9} \\ \frac{1}{9} & \frac{1}{9} & \frac{1}{9} \\ \frac{1}{9} & \frac{1}{9} & \frac{1}{9} \end{bmatrix} \quad \text{(Formula 6)}$$

The matrix indicated above is the coefficient setting for a low-pass filter that performs a process of calculating the average value of the pixel values of the nine pixels located in the pixel region (n×n, n=3) centered on the correction target pixel to designate as the corrected pixel value for the correction target pixel.

In a case where the following settings are employed:
LPF$_0$ is a moving average filter of 3×3 (pixels);
LPF$_1$ is a moving average filter of 13×13 (pixels); and
LPF$_2$ is a moving average filter of 25×25 (pixels),
a smoothing process using a smaller pixel region (3×3) as a processing unit is performed when LPF$_0$ is applied, while a smoothing process using a more pixel region (13×13) as a processing unit is performed when LPF$_1$ is applied and a smoothing process using a larger pixel region (25×25) as a processing unit is performed when LPF$_2$ is applied.

The example illustrated in FIG. 11 is an example of executing different processes in accordance with the image characteristics in a similar manner as described earlier with reference to FIG. 10 and indicates a process example in which the low-pass filter (LPF) to be applied to the output signal calculation formulas indicated as above-mentioned (Formula 5) is switched in accordance with the image characteristics.

The application approaches for the low-pass filters (LPFs) according to the image characteristics are set as follows.

(1) Frequency=low range, positional deviation=small, that is, the region (1) illustrated in FIG. 11 is correlated.

This region is a region satisfying the following conditions:
frequency-corresponding blend ratio setting parameter: ratio$_{Freq}$<Th$_{f1}$; and
positional deviation-corresponding blend ratio setting parameter:ratio$_{Err}$<Th$_{e1}$. Note that Th indicates a threshold value.

The image region having these image characteristics is a low frequency region, that is, a flat image region with little change in pixel value and at the same time, is the image region with the positional deviation=small, that is, an image region where the "positional deviation" in which a pixel value other than the pixel value corresponding to the original pixel position is output (=estimated as the occurrence of false color) is small.

For the image region having such image characteristics, a low-pass filter (LPF$_0$) having the highest cutoff frequency is applied as the LPF in the output signal calculation formulas of above-mentioned (Formula 5) to calculate the corrected UV signal (Uout, Vout) 203.

Through this low-pass filter (LPF$_0$) application process, the corrected UV signal (Uout, Vout) 203 is calculated with the setting in which the blend ratio of the RGB sensor output image (position-aligned YUV image 161) is set to be high and the blend ratio of the W sensor output image (W-RAW image 111) is set to be small.

(2) Frequency=high range, positional deviation=large, that is, the region (2) illustrated in FIG. 11 is correlated.

This region is a region satisfying the following conditions:
frequency-corresponding blend ratio setting parameter: Th$_{f2}$≤ratio$_{Freq}$; and
positional deviation-corresponding blend ratio setting parameter:Th$_{e1}$≤ratio$_{Err}$. Note that Th indicates a threshold value.

The image region having these image characteristics is a high frequency region, that is, an image region where the pixel value greatly changes and at the same time, is the image region with the positional deviation=large, that is, an image region where the "positional deviation" in which a pixel value other than the pixel value corresponding to the original pixel position is output (=estimated as the occurrence of false color) is large.

For the image region having such image characteristics, a low-pass filter (LPF$_2$) having the lowest cutoff frequency is applied as the LPF in the output signal calculation formulas of above-mentioned (Formula 5) to calculate the corrected UV signal (Uout, Vout) 203.

Through this low-pass filter (LPF$_2$) application process, the corrected UV signal (Uout, Vout) 203 is calculated with the setting in which the blend ratio of the RGB sensor output image (position-aligned YUV image 161) is set to be low and the blend ratio of the W sensor output image (W-RAW image 111) is set to be high.

(3) Other regions, that is, the region (3) illustrated in FIG. 11, which is a region other than (1) and (2), is correlated.

For the image region having these image characteristics, a low-pass filter (LPF$_1$) having a medium cutoff frequency is applied as the LPF in the output. signal calculation formulas of above-mentioned (Formula 5) to calculate the corrected. UV signal (Uout, Vout) 203.

Through this low-pass filter (LPF$_0$) application process, the corrected UV signal (Uout, Vout) 203 is calculated while the blend ratio of the RUB sensor output image (position-aligned YUV image 161) and the blend ratio of the U sensor output image (U-RAW image 111) have substantially the same extent.

FIG. 12 is a diagram summarizing the process in FIG. 11 and illustrates data corresponding to the following respective pieces of data.

(a) Characteristics of image region
(b) Parameter value
(c) Applied filter
(d) Corrected UV value (U$_{out}$, V$_{out}$)
(e) Blend ratio setting example for RGB sensor output image and W sensor output image The entry (1) in FIG. 12 corresponds to the region (1) illustrated in FIG. 11 and has the following image characteristics and correction process approach.

(a) Characteristics of image region: frequency=low, positional deviation=small (b) Parameter value: frequency-corresponding blend ratio setting parameter=$\text{ratio}_{Freq} < \text{Th}_{f1}$, positional deviation-corresponding blend ratio setting parameter=$\text{ratio}_{Err} < \text{Th}_{e1}$ (c) Applied filter: $LPF_0$ (d) Corrected UV value $(U_{out}, V_{out})$: $U_{out}=U_0=LPF_0(U)$, $V_{out}=V_0=LPF_0(V)$ (e) Blend ratio setting example for RGB sensor output image and W sensor output image: RGB sensor output >W sensor output Note that $LPF_0(U)$ and $LPF_0(V)$ in (d) indicate a process of applying LPF to the LPF in above-mentioned (Formula 5) to calculate the corrected UV signal (Uout, Vout).

The entry (3) in FIG. 12 corresponds to the region (3) illustrated an FIG. 11 and has the following image characteristics and correction process approach.

(a) Characteristics of image region: frequency=high, positional deviation=large (b) Parameter value: the frequency-corresponding blend ratio setting parameter is designated as $\text{Th}_{f2} \leq \text{ratio}_{Freq}$, and the positional deviation-corresponding blend ratio setting parameter is designated as $\text{Th}_{e1} \leq \text{ratio}_{Err}$ (c) Applied filter: $LPF_2$ (d) Corrected UV value $(U_{out}, V_{out})$: $U_{out}=U_2=LPF_2(U)$, $V_{out}=V_2=LPF_2(V)$ (e) Blend ratio setting example for RGB sensor output image and W sensor output image: RGB sensor output <W sensor output The entry (2) in FIG. 12 corresponds to the region (2) illustrated in FIG. 11 and has the following image characteristics and correction process approach.

(a) Characteristics of image region: other than (1) and (3)

(b) Parameter value: other than (1) and (3)

(c) Applied filter: $LPF_1$ (d) Corrected UV value $(U_{out}, V_{out})$: $U_{out}=U_1=LPF_1(U)$, $V_{out}=V_1=LPF_1(V)$ (e) Blend ratio setting example for RGB sensor output image and W sensor output image: RGB sensor output W sensor output The applied filter is altered in accordance with the image characteristics in this manner, such that the blend ratio according to the image characteristics, that is, the blend ratio between the RGB sensor output image (position-aligned YUV image 161) and the W sensor output image (W-RAW image 111) is altered) to calculate the final corrected UV signal (Uout, Vout) 203.

Note that the example of application process of the low-pass filter (LPF) in accordance with the image characteristics described with reference to FIGS. 11 and 12 is an example and a variety of other settings also can be made.

For example, FIG. 13 illustrates an example of image characteristics and application regions of four different low-pass filters ($LPF_0$ to $LPF_3$) to be applied in accordance with respective image characteristics.

The four low-pass filters ($LPF_0$ to $LPF_3$) are distinguished from each other by variation in cutoff frequency, where the cutoff frequency of $LPF_0$ is the highest and the cutoff frequency of $LPF_3$ is the lowest.

As illustrated in FIG. 13, an LPF having a lower cutoff frequency, for example, an LPF such as $LPF_3$, is applied, as the frequency-corresponding blend ratio setting parameter [$\text{ratio}_{Freq}$] or the positional deviation-corresponding blend ratio setting parameter [$\text{ratio}_{Err}$] is closer to one.

Meanwhile, an LPF having a higher cutoff frequency, for example, an LPF such as $LPF_0$, is applied, as the frequency-corresponding blend ratio setting parameter [$\text{ratio}_{Freq}$] or the positional deviation-corresponding blend ratio setting parameter [$\text{ratio}_{Err}$] is closer to zero.

FIG. 14 illustrates an application example of further different region-corresponding filters. FIG. 14 illustrates an example of image characteristics and application regions of five different low-pass filters ($LPF_0$ to $LPF_4$) to be applied in accordance with respective image characteristics.

The five low-pass filters ($LPF_0$ to $LPF_4$) are distinguished from each other by variation in cutoff frequency, where the cutoff frequency of $LPF_0$ is the highest and the cutoff frequency of $LPF_4$ is the lowest.

As illustrated in FIG. 14, an LPF having a lower cutoff frequency, for example, an LPF such as $LPF_4$, is applied, as the frequency-corresponding blend ratio setting parameter [$\text{ratio}_{Freq}$] or the positional deviation-corresponding blend ratio setting parameter [$\text{ratio}_{Err}$] is closer to one.

Meanwhile, an LPF having a higher cutoff frequency, for example, an LPF such as $LPF_0$, is applied, as the frequency-corresponding blend ratio setting parameter [$\text{ratio}_{Freq}$] or the positional deviation-corresponding blend ratio setting parameter [$\text{ratio}_{Err}$] is closer to zero.

[4. About Image Process using Plurality of Different Low-pass Filters Combined in accordance with Image Characteristics]

Next, another embodiment of the generation process for the corrected UV signal (Uout, Vout) 203 to be executed by the image correction unit 126 will be described with reference to FIG. 15 and the following drawings.

The embodiment described below is an example of performing the image process using a plurality of different low-pass filters combined in accordance with the image characteristics.

The process example described below is one of specific process examples that implement the above-described blending process for an image in accordance with the image characteristics in units of image regions. That is, this is a specific example of the generation process for the corrected UV signal (Uout, Vout) 203 to be executed by the image correction unit 126 and is a process example using a plurality of different low-pass filters combined in accordance with the image characteristics.

As illustrated in FIG. 15, the image correction unit 126 receives inputs of the following respective pieces of data:

(a) the W-RAW image 111 which is a photographed image by the first imaging unit 107;

(b) the position-aligned YUV image 161 generated by the position alignment unit 123;

(c) the frequency-corresponding blend ratio setting parameter [$\text{ratio}_{Freq}$] generated by the frequency-corresponding parameter calculation unit 124; and (d) the positional deviation-corresponding blend ratio setting parameter [$\text{ratio}_{Err}$] generated by the positional deviation-corresponding parameter calculation unit 125.

The image correction unit 126 receives inputs of these pieces of data and generates the corrected UV signal (Uout, Vout) 203, which is an output signal value of the chrominance signal UV constituting the pixel value of the corrected image (YUV image) in which false colors have been reduced, to output to the signal conversion unit 127 in the image processor 120 illustrated in FIG. 3.

The image correction unit 126 generates the corrected UV signal (Uout, Vout), for example, in line with the output signal calculation formulas illustrated in FIG. 15(a).

The output signal calculation formulas illustrated in FIG. 15(a) are formulas created on the basis of (Formula 5) described above, that is, the output signal calculation formulas illustrated in FIG. 9(a).

The output signal calculation formulas illustrated in FIG. 15(a) work as an formula for altering the blend ratio of the image in accordance with the image region characteristics by applying the frequency-corresponding blend ratio setting parameter [ratio$_{Freq}$] and the positional deviation-corresponding blend ratio setting parameter [ratio$_{Err}$] to generate the corrected UV signal (Uout, Vout).

The image correction unit 126 generates the corrected UV signal (Uout, Vout) in line with the output signal calculation formulas illustrated in FIG. 15(a), that is, (Formula 7) indicated below.

[Mathematical Formula 7]

$$U_{out}=(1-\text{ratio}_{Err})((1-\text{ratio}_{Freq})\times U_0+\text{ratio}_{Freq}\times U_1)+\text{ratio}_{Err}\times U_2$$

$$V_{out}=(1-\text{ratio}_{Err})((1-\text{ratio}_{Freq})\times V_0+\text{ratio}_{Freq}\times V_1)+\text{ratio}_{Err}\times V_2 \quad \text{(Formula 7)}$$

Note that, in above (Formula 7), $U_0$, $U_1$, and $U_2$, and $V_0$, $V_1$, and $V_2$ denote UV values obtained as pixel value conversion results to which a plurality of different low-pass filters (LPFs) have been applied.

A specific configuration of above (Formula 7) will be described with reference to FIG. 16.

FIG. 16(a) illustrates formulas similar to the formulas illustrated in FIG. 15(a), that is, calculation formulas for the corrected UV signal (Uout, Vout) illustrated in above (Formula 7).

With reference to FIGS. 16(b) and 16(c), $U_0$, $U_1$, and $U_2$ and $V_0$, $V_1$, and $V_2$ in the formulas illustrated in FIG. 16(a) will be described.

As illustrated in FIG. 16(b), Un and Vn (n=0 to 3) are calculated by following (Formula 8).

[Mathematical Formula 8]

$$U_n = LPF_n(U) \times \frac{W}{LPF_n(W)} \quad \text{(Formula 8)}$$
$$V_n = LPF_n(V) \times \frac{W}{LPF_n(W)}$$

Above-mentioned (Formula 8) indicates formulas that execute the blending process on the two images, that is:

(a) the W-RAN image 111 which is a photographed image by the first imaging unit 107; and (b) the position-aligned YUV image 161 generated by the position alignment unit 123, as in (Formula 5) described above, that is, the output signal calculation formulas described with reference to FIG. 9(a).

However, the low-pass filter to be applied differs depending on the value of n of Un and Vn (n=0 to 3).

$U_0$ and $V_0$ denote UV values obtained by applying the low-pass filter $LPF_0$ to the UV pixel value of the position-aligned YUV image 161 generated by the position alignment unit 123 as input data.

$U_1$ and $V_1$ denote UV values obtained by applying the lowpass filter $LPF_1$ to the UV pixel value of the position-aligned YUV image 161 generated by the position alignment unit 123 as input data.

$U_2$ and $V_2$ denote UV values obtained by applying the low-pass filter $LPF_2$ to the UV pixel value of the position-aligned YUV image 161 generated by the position alignment unit 123 as input data.

These low-pass filters will be described with reference to FIG. 16(c).

As illustrated in FIG. 16(c), the correspondence relationships between the UV pixel value of the position-aligned YUV image 161 generated by the position alignment unit 123 as input data and the UV values ($U_0$, $U_1$, and $U_2$, and $V_0$, $V_1$, and $V_2$) after the filtering process obtained as the application results of the low-pass filters ($LPF_0$ to $LPF_2$) are as follows.

$U_0=LPF_0(U)$
$V_0=LPF_0(V)$
$U_1=LPF_1(U)$
$V_1=LPF_1(V)$
$U_2=LPF_2(U)$
$V_2=LPF_2(V)$

The three low-pass filters ($LPF_0$ to $LPF_2$) are distinguished from each other by variation in cutoff frequency, where the cutoff frequency of $LPF_0$ is the highest and the cutoff frequency of $LPF_2$ is the lowest.

For example, low-pass filters with the following settings can be applied as the respective low-pass filters:

$LPF_0$ is a moving average filter of 3×3 (pixels);
$LPF_1$ is a moving average filter of 13×13 (pixels); and
$LPF_2$ is a moving average filter of 25×25 (pixels).

The moving average filters having such settings can be applied as the above three low-pass filters ($LPF_0$ to $LPF_2$).

Note that, as described earlier, the moving average filter carries out a process of calculating the average pixel value of all the pixels in the pixel region (n×n, n=3, 13, 25, and the like) centered on the correction target pixel and setting this calculated pixel value as the corrected pixel value.

For example, the coefficient setting of the moving average filter of 3×3 is set as illustrated in (Formula 6) described above.

Three types of low-pass filters (LPFs) having the following settings, that is.

$LPF_0$ as a moving average filter of 3×3 (pixels),
$LPF_1$ as a moving average filter of 13×13 (pixels), and
$LPF_2$ as a moving average filter of 25×25 (pixels), are applied to the image, such that the smoothing process as described below is executed.

A smoothing process using a smaller pixel region (3×3) as a processing unit is performed when $LPF_0$ is applied, while a smoothing process using a more pixel region (13×13) as a processing unit is performed when $LPF_1$ is applied and a smoothing process using a larger pixel region (25×25) as a processing unit is performed when $LPF_2$ is applied.

As previously mentioned, the frequency-corresponding blend ratio setting parameter [ratio$_{Freq}$] becomes:

a larger value, that is, a value close to one in a high frequency region where the pixel value finely changes; and a smaller value, that is, a value close to zero in a flat image region where a change in pixel value is small, that is, in a low frequency region.

In addition, the positional deviation-corresponding blend ratio setting parameter [ratio$_{Err}$] becomes:

a larger value, that is, a value close to one in a pixel region where the positional deviation is large (=there are many false colors); and a smaller value, that is, a value close to zero in a pixel region where the positional deviation is small (=there are few false colors).

For example, above-mentioned (Formula 7) is as follows:

$$U_{out}=(1-\text{ratio}_{Err})((1-\text{ratio}_{Freq})\times U_0+\text{ratio}_{Freq}\times U_1)+\text{ratio}_{Err}\times U_2$$

$$V_{out}=(1-\text{ratio}_{Err})((1-\text{ratio}_{Freq})\times V_0+\text{ratio}_{Freq}\times V_1)+\text{ratio}_{Err}\times V_2 \qquad \text{(Formula 7)}.$$

How the corrected UV signal ($U_{out}$, $V_{out}$) calculated in line with above (Formula 7) is set in accordance with the image characteristics will be described with reference to FIG. 17.

Figure 17:
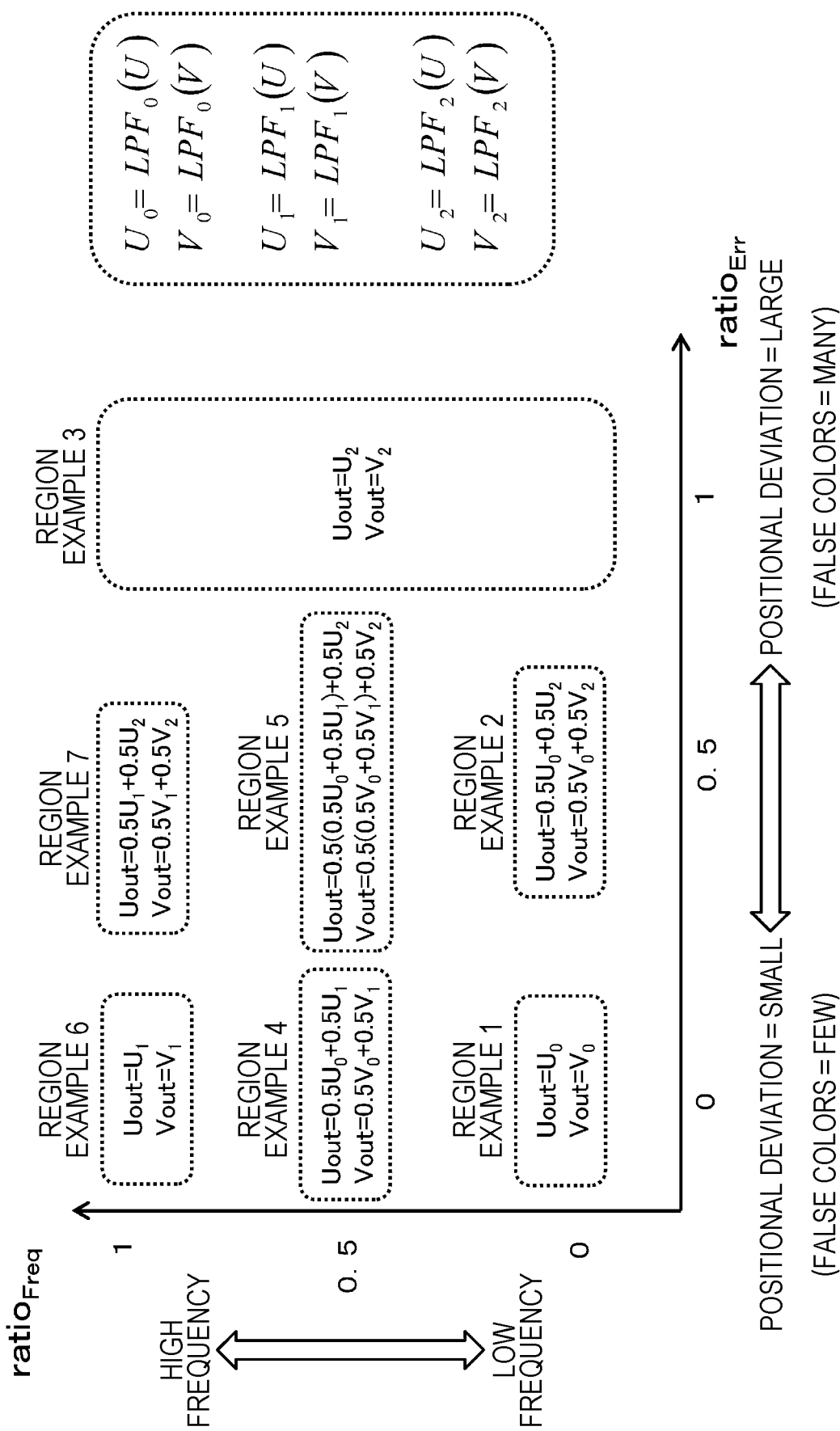
FIG. 17 is a diagram for explaining a process executed by the image correction unit.

FIG. 17 illustrates respective axes in such a manner that the abscissa axis indicates the positional deviation (representing the false color amount) and the ordinate axis indicates the frequency and also illustrates region examples 1 to 7 according to a plurality of representative image characteristics.

Hereinafter, how the corrected UV signal ($U_{out}$, $V_{out}$) calculated in line with above (Formula 7) is set in accordance with the image characteristics (the positional deviation and the frequency) corresponding to the region examples 1 to 7 will be described.

(Region Example 1) Pixel region with small positional deviation (few false colors):$\text{ratio}_{Err}=0$ and low frequency region:$\text{ratio}_{Freq}=0$ As described above, for the low frequency region where the positional deviation is small and a change in pixel value is small, the following settings are made:

$$U_{out}=U_0$$

$$V_{out}=V_0.$$

That is, a pixel value obtained by applying $LPF_0$ having the highest cutoff frequency among the three low-pass filters ($LPF_0$, $LPF_1$, and $LPF_2$) to the input UV value (U, V) is set as the corrected UV signal ($U_{out}$, $V_{out}$).

(Region Example 2) Pixel region with medium positional deviation (medium number of false colors):$\text{ratio}_{Err}=0.5$ and low frequency region:$\text{ratio}_{Freq}=0$ As described above, for the low frequency region where the positional deviation is medium and a change in pixel value is small, the following settings are made:

$$U_{out}=0.5\times U_0+0.5\times U_2$$

$$V_{out}=0.5\times V_0+0.5\times V_2.$$

That is, the average value of a pixel value obtained by applying $LPF_0$ having the highest cutoff frequency among the three low-pass filters ($LPF_0$, $LPF_1$, and $LPF_2$) to the input UV value (U, V) and a pixel value obtained by applying $LPF_2$, having the lowest cutoff frequency thereamong to the input. UV value (U, V) is set as the corrected UV signal ($U_{out}$, $V_{out}$).

(Region Example 3) Pixel region with large positional deviation (many false colors):$\text{ratio}_{Err}=1$ and low frequency region to high frequency region:$\text{ratio}_{Freq}=0$ to 1

As described above, for the pixel region where the positional deviation is large, the following settings are made:

$$U_{out}=U_2$$

$$V_{out}=V_2$$

in the entire region from the low frequency to the high frequency.

That is, a pixel value obtained by applying $LPF_2$ having the lowest cutoff frequency among the three low-pass filters ($LPF_0$, $LPF_1$, and $LPF_2$) to the input UV value (U, V) is set as the corrected UV signal ($U_{out}$, $V_{out}$).

(Region Example 4) Pixel region with small positional deviation (few false colors):$\text{ratio}_{Err}=0$ and medium frequency region:$\text{ratio}_{Freq}=0.5$ As described above, for the frequency region where the positional deviation is small and a change in pixel value is medium, the following are employed:

$$U_{out}=0.5\times U_0+0.5\times U_1$$

$$V_{out}=0.5\times V_0+0.5\times V_1.$$

That is, the average value of a pixel value obtained by applying $LPF_0$ having the highest cutoff frequency among the three low-pass filters ($LPF_0$, $LPF_1$, and $LPF_2$) to the input UV value (U, V) and a pixel value obtained by applying $LPF_1$ having the medium cutoff frequency thereamong to the input UV value (U, V) is set as the corrected UV signal ($U_{out}$, $V_{out}$).

(Region Example 5) Pixel region with medium positional deviation (medium number of false colors):$\text{ratio}_{Err}=0.5$ and medium frequency region:$\text{ratio}_{Freq}=0.5$ As described above, for the frequency region where the positional deviation is medium and a change in pixel value is medium, the following settings are made:

$$U_{out}=0.5\times(0.5\times U_0+0.5+U_1)+0.5\times U_2$$

$$V_{out}=0.5\times(0.5\times V_0+0.5\times V_1)+0.5\times V_2.$$

That is, the average value of the average value of a pixel value obtained by applying $LPF_0$ having the highest cutoff frequency among the three low-pass filters ($LPF_0$, $LPF_1$, and $LPF_2$) to the input UV value (U, V) and a pixel value obtained by applying $LPF_1$ having the medium cutoff frequency thereamong to the input UV value (U, V), and a pixel value obtained by applying $LPF_2$ having the lowest cutoff frequency thereamong to the input UV value (U, V) is set as the corrected UV signal ($U_{out}$, $V_{out}$).

(Region Example 6) Pixel region with small positional deviation (few false colors):$\text{ratio}_{Err}=0$ and high frequency region:$\text{ratio}_{Freq}=1$ As described above, for the high frequency region where the positional deviation is small and the pixel value finely changes, the following settings are made:

$$U_{out}=U_1$$

$$V_{out}=V_1.$$

That is, a pixel value obtained by applying $LPF_1$ having the medium cutoff frequency among the three low-pass filters ($LPF_0$, $LPF_1$, and $LPF_2$) to the input UV value (U, V) is set as the corrected UV signal ($U_{out}$, $V_{out}$).

(Region Example 7) Pixel region with medium positional deviation (medium number of false colors):$\text{ratio}_{Err}=0.5$ and high frequency region:$\text{ratio}_{Freq}=1$ As described above, for the high frequency region where the positional deviation is medium and the pixel value finely changes, the following are employed:

$$U_{out}=0.5\times U_1+0.5\times U_2$$

$$V_{out}=0.5\times V_1+0.5\times V_2.$$

That is, the average value of a pixel value obtained by applying $LPF_1$ having the medium cutoff frequency among the three low-pass filters ($LPF_0$, $LPF_1$, and $LPF_2$) to the input UV value (U, V) and a pixel value obtained by applying $LPF_2$ having the lowest cutoff frequency thereamong to the input UV value (U, V) is set as the corrected UV signal ($U_{out}$, $V_{out}$).

In this embodiment, as described thus far, the image correction unit 126 generates the corrected UV signal ($U_{out}$, $V_{out}$) 203 in line with the output signal calculation formulas (Formula 7) illustrated in FIG. 15(*a*).

The correspondence with the process executed by the image correction unit 126 in accordance with the features of the region at the time of the generation process for the corrected UV signal ($U_{out}$, $V_{out}$) 203 is summarized as follows.

In a region where the positional deviation is large (estimated that there are many false colors), the low-pass filter $LPF_2$ with a low cutoff frequency is used to execute the process of smoothing on the basis of the pixel values of surrounding pixels a wider range (for example, 25×25 pixels).

In a region where the positional deviation is small (estimated that there are few false colors), the low-pass filter $LPF_1$ with a medium cutoff frequency is used to execute the process of smoothing on the basis of the pixel values of surrounding pixels in a medium range (for example, 13×13 pixels) for a region where there are many high frequency components.

Meanwhile, for the low frequency region where there are few high frequency components, the lowpass filter $LPF_0$ with a high cutoff frequency is used to execute the process of smoothing on the basis of the pixel values of surrounding pixels in a small range (for example, 3×3 pixels).

In a region where the positional deviation is medium (estimated that there are some number of false colors), an intermediate process between the above process for the region where the positional deviation is large (estimated that there are many false colors) and the above process for the region where the positional deviation is small (estimated that there are few false colors) is executed.

The image correction unit 126 generates the corrected UV signal ($U_{out}$, $V_{out}$) 203 in accordance with the characteristics of the image region as described above and outputs the generated signal to the signal conversion unit 127 in the image processor 120 illustrated in FIG. 3.

The signal conversion unit 127 receives inputs of the corrected UV signal ($U_{out}$/$V_{out}$) 203 generated by the image correction unit 126 and the W-RAW image 111 which is a photographed image by the first imaging unit 107.

The signal conversion unit 127 executes signal conversion on the basis of these input signals and generates the RGB image 150 to output.

The signal conversion unit 127 employs the W signal of the W-RAW image 111 as the Y (luminance) signal and executes a process of converting the YUV signal constituted by the combination of this Y (luminance) signal and the UV signal of the corrected UV signal ($U_{out}$, $V_{out}$) 203 into an RGB signal.

This signal conversion process is performed in line with an existing conversion formula.

The RGB image 150 generated by the signal conversion unit 127 is displayed, for example, on the display unit. Alternatively, the RGB image 150 is saved in the storage unit. Alternatively, the RGB image 150 is output to another external information processing apparatus.

Note that, in some cases, an encoding process such as a compression process is executed as a preprocess for a saving process to the storage unit and an external output process.

In addition, turning the YUV signal into the RGB signal is not essential and the YUV signal may be configured to be output to a display apparatus, or saved in the storage unit, or output to the outside as it is.

[5. About Processing Sequence of Image Process Executed by Image Processing Apparatus]

Next, a processing sequence of the image process executed by the image processing apparatus will be described with reference to a flowchart illustrated in FIG. 18.

The flowchart illustrated in FIG. 16 is executed under the control of the control unit (data processor) equipped with a CPU or the like that, for example, executes a process in line with a processing program saved in the storage unit.

Hereinafter, processes in respective steps illustrated in FIG. 18 will be sequentially described.

(Steps S101a and 101b)

Steps S101a and 101b are image photographing processes.

Two images are photographed by the first imaging unit 107 and the second imaging unit 108 of the imaging unit 106 illustrated in FIG. 1.

Step S101a is a photographing process for an RGB image to be executed by the second imaging unit 108 provided with an imaging element having the RGB pixel array such as the Bayer array described earlier with reference to FIG. 2(a).

Step S101b is a photographing process for a white (W) image to be executed by the first imaging unit 107 provided with an imaging element having the white (W) pixel array described earlier with reference to FIG. 2(b).

(Step S102)

Next, in step S102, a development process for the RGB image photographed by the second imaging unit 108 in step S101a is executed.

This process is executed by the development processor 121 of the image processor 120 illustrated in FIG. 3.

As described above, the development processor 121 executes the development process on the RGB-RAW image 112 input from the second imaging unit 108. Specifically, for example, the following processes are executed:

(a) a clamping process of removing a direct current (DC) offset occurring on the basis of a circuit constituting the imaging element or an offset component based on a noise signal;

(b) a demosaic process of setting three RGB signals to respective pixels on the basis of RGB single signal values set for each pixel of the RGB-RAW image;

(c) a white balance process of regulating RGB values with respect to a white subject; and (d) a conversion process on the RGB values to YUV values.

These processes are executed.

(Step S103)

Next, in step S103, a detection process for the motion vector (MV) is executed.

This process is executed by the motion vector detection unit 122 of the image processor 120 illustrated in FIG. 3.

The motion vector detection unit 122 receives an input of the W image 111 from the first imaging unit 107 and also receives an input of a Y signal (luminance signal) of the YUV image 130 generated by the development processor 121 on the basis of the RGB-RAW image 112 which is a photographed image by the second imaging unit 108.

On the basis of these two signals (the W signal and the Y signal), the motion vector detection unit 122 detects a motion vector (MV) representing a positional deviation between the two images.

As described earlier, the first imaging unit 107 and the second imaging unit 108, which are included in the imaging unit 106 of the image processing apparatus 100 illustrated in FIG. 1, serve as two imaging units set at positions a predetermined interval apart from each other and the photographed images by the respective units are obtained as images from different viewpoints. That is, the images are obtained as images having parallax.

Therefore, the same subject image is not photographed at corresponding pixels of the two images, that is, pixels at the same position, and a subject deviation according to parallax occurs.

On the basis of these two signals (the N signal and the Y signal), the motion vector detection unit 122 detects a motion vector (MV) representing a positional deviation between the two images.

Specifically, corresponding points of two images (the W image and the Y image) are found and a vector connecting these corresponding points is calculated as a motion vector (MV).

The motion vector (MV generated by the motion vector detection unit 122 is input to the position alignment unit 123.

(Step S104)

Next, in step S104, the position alignment process is executed.

This process is a process executed by the position alignment unit 123 of the image processor 120 illustrated in FIG. 3.

The position alignment unit 123 receives an input of the motion vector (MV) generated by the motion vector detection unit 122 and also receives an input of the YUV image 130 generated by the development processor 121 on the basis of the RGB-RAW image 112.

The position alignment unit 123 moves each pixel position in the YUV image 130 in line with the size and direction of the motion vector (MV) to generate the W image, that is, a YUV image similar to an image photographed from the same viewpoint position as that of the W-RAW image 111 which is a photographed image by the first imaging unit 107.

Through this process, the YUV image 130 is converted into a YUV image that is regarded as photographed from the same viewpoint as that of the first imaging unit 107.

(Step S105)

Next, in step S105, the frequency-corresponding parameter calculation process is executed.

This process is a process executed by the frequency-corresponding parameter calculation unit 124 of the image processor 120 illustrated in FIG. 3.

As described earlier with reference to FIG. 4, the frequency-corresponding parameter calculation unit 124 receives inputs of the W-RAW image 111 which is a photographed image by the first imaging unit 107 and the sensor noise characteristic (σ) 113 and, on the basis of these pieces of input data, calculates the frequency-corresponding blend ratio setting parameter, which is a correction parameter for use in false color correction, to output to the image correction unit 126.

As described above with reference to FIG. 5, the frequency-corresponding parameter calculation unit 124 calculates the frequency-corresponding blend ratio setting parameter [$ratio_{Freq}$] for all the pixels constituting the W-RAW image 111 which is a photographed image by the first imaging unit 107 and inputs the calculated parameter to the image correction unit 126.

(Step S106)

Next, in step S106, the positional deviation-corresponding parameter calculation process is executed.

This process is a process executed by the positional deviation-corresponding parameter calculation unit 125 of the image processor 120 illustrated in FIG. 3.

As described above with reference to FIGS. 3 and 6 to 8, the positional deviation-corresponding parameter calculation unit 125 receives inputs of the W-RAW image 111, which is a photographed image by the first imaging unit 107, a YUV image after position alignment generated by the position alignment unit 123, that is, a YUV image equivalent to an image photographed from the photographing viewpoint of the first imaging unit 107, and the sensor noise characteristic (σ) 113 and, on the basis of these pieces of input data, calculates the positional deviation-corresponding blend ratio setting parameter, which is a correction parameter for use in false color correction, to output to the image correction unit 126.

Note that, properly, the positional deviation between the W-RAW image 111 which is a photographed image by the first imaging unit 107 and the YUV image after position alignment generated by toe position alignment unit 123 should be eliminated. However, a difference occurs in each pixel value (W pixel value) depending on the pixel position. This difference is thought to be a false color and is described as a "positional deviation-corresponding parameter" under the interpretation that the pixel with such a difference is a pixel that should be output to a pixel position different from the pixel position of the original pixel value.

Therefore, "large positional deviation" represents "many false colors" and "small positional deviation" represents "few false colors".

The positional deviation-corresponding parameter calculation unit 125 calculates the positional deviation-corresponding blend ratio setting parameter [$ratio_{Err}$] in line with the configuration in FIG. 6 described above.

The positional deviation-corresponding blend ratio setting parameter [$ratio_{Err}$] becomes:

a larger value, that is, a value close to one in a pixel region where the positional deviation is large (=there are many false colors); and a smaller value, that is, a value close to zero in a pixel region where the positional deviation is small (=there are few false colors).

The positional deviation-corresponding blend ratio setting parameter [$ratio_{Err}$] calculated by the positional deviation-corresponding parameter calculation unit 125 is input to the image correction unit 126 in the image processor 120 illustrated in FIG. 3.

(Step S107)

The processes in steps S107 and S108 are processes executed by the image correction unit 126 of the image processor 120 illustrated in FIG. 3.

The image correction unit 126 receives inputs of the following respective pieces of data:

(a) the W-RAW image 111 which is a photographed image by the first imaging unit 107;

(b) the position-aligned YUV image 161 generated by the position alignment unit 123;

(c) the frequency-corresponding blend ratio setting parameter [$ratio_{Freq}$] generated by the frequency-corresponding parameter calculation unit 124; and (d) the positional deviation-corresponding blend ratio setting parameter [$ratio_{Err}$] generated by the positional deviation-corresponding parameter calculation unit 125.

The image correction unit 126 receives inputs of these pieces of data and generates the corrected UV signal (Uout, Vout) 203, which is an output signal value of the chrominance signal UV constituting the pixel value of the corrected image (YUV image) in which false colors have been reduced, to output to the signal conversion unit 127 in the image processor 120 illustrated in FIG. 3.

First, in step S107, the image correction unit 126 applies the input data and applies the plurality of different low-pass filters ($LPF_0$, $LPF_1$, and $LPF_2$) specifically, the low-pass filters having different cutoff frequencies from each other, to generate different UV images, that is, the following respective UV images described above with reference to FIGS. 15 to 17.

$U_0 = LPF_0 (U)$
$V_0 = LPF_0 (V)$
$U_1 = LPF_1 (U)$
$V_1 = LPF_1 (V)$
$U_2 = LPF_2 (U)$
$V_2 = LPF_2 (V)$

The three low-pass filters ($LPF_0$ to $LPF_2$) are distinguished from each other by variation in cutoff frequency, where the cutoff frequency of $LPF_0$ is the highest and the cutoff frequency of $LPF_2$ is the lowest.

For example, low-pass filters with the following settings can be applied as the respective low-pass filters:

$LPF_0$ is a moving average filter of 3×3 (pixels);
$LPF_1$ is a moving average filter of 13×13 (pixels); and
$LPF_2$ is a moving average filter of 25×25 (pixels).

The moving average filters having such settings can be applied as the above three low-pass filters ($LPF_0$ to $LPF_2$).

(Step S108)

Next, in step S108, the image correction unit 126 applies $U_0$ to $U_3$ and $V_0$ to $V_0$ calculated in step S107 and the two blend ratio setting parameters, namely, (1) the frequency-corresponding blend ratio setting parameter [$ratio_{Freq}$] generated by the frequency-corresponding parameter calculation unit 124, and (2) the positional deviation-corresponding blend ratio setting parameter [$ratio_{Err}$] generated by the positional deviation-corresponding parameter calculation unit 125, to calculate the corrected UV signal ($U_{out}$, $V_{out}$) 203.

As described above, the calculation process for this corrected UV signal ($U_{out}$, $V_{out}$) is calculated, for example, in line with following (Formula 7), that is, $$U_{out} = (1 - ratio_{Err})((1 - ratio_{Freq}) \times U_0 + ratio_{Freq} \times U_1) + ratio_{Err} \times U_2$$

$$V_{out} = (1 - ratio_{Err})((1 - ratio_{Freq}) \times V_0 + ratio_{Freq} \times V_1) + ratio_{Err} \times V_2 \quad \text{(Formula 7)}.$$

Alternatively, a process of altering the filter to be applied in accordance with the image characteristics by applying above-described (Formula 5) illustrated in FIG. 9(a) may be adopted.

Note that, as described above, the calculation process for the corrected UV signal ($U_{out}$, $V_{out}$) executed by the image correction unit 126 in accordance with the features of the region is executed according to the following approaches.

(a) In a region where the positional deviation is large (estimated that there are many false colors), the low-pass filter $LPF_2$ with a low cutoff frequency is preferentially used to execute the process of smoothing on the basis of the pixel values of surrounding pixels in a wider range (for example, 25×25 pixels).

(b) In a region where the positional deviation is small (estimated that there are few false colors), the lowpass filter $LPF_1$ with a medium cutoff frequency is preferentially used to execute the process of smoothing on the basis of the pixel values of surrounding pixels in a medium range (for example, 13×13 pixels) for a region where there are many high frequency components.

Meanwhile, for the low frequency region where there are few high frequency components, the low-pass filter $LPF_0$ with a high cutoff frequency is preferentially used to execute the process of smoothing on the basis of the pixel values of surrounding pixels in a small range (for example, 3×3 pixels).

(c) In a region where the positional deviation is medium (estimated that there are some number of false colors), an intermediate process between the above process for the region where the positional deviation is large (estimated that, there are many false colors) and the above process for the region where the positional deviation is small (estimated that there are few false colors) is executed.

The image correction unit 126 generates the corrected UV signal ($U_{out}$, $V_{out}$) 203 in accordance with the characteristics of the image region as described above and outputs the generated signal to the signal conversion unit 127 in the image processor 120 illustrated in FIG. 3.

(Step S109)

The process in step S109 is a process executed by the signal conversion unit 127 of the image processor 120 illustrated in FIG. 3.

The signal conversion unit 127 receives inputs of the corrected UV signal ($U_{out}$, $V_{out}$) 203 generated by the image correction unit 126 and the W-RAW image 111 which is a photographed image by the first imaging unit 107.

The signal conversion unit 127 executes signal conversion on the basis of these input signals and generates the RGB image 150 to output.

The signal conversion unit 127 employs the W signal of the W-RAW image 111 as the Y (luminance) signal and executes a process of converting the YUV signal constituted by the combination of this Y (luminance) signal and the UV signal of the corrected UV signal ($U_{out}$, $V_{out}$) 203 into an RGB signal.

This signal conversion process is performed in line with an existing conversion formula.

The RGB image 150 generated by the signal conversion unit 127 is displayed, for example, on the display unit. Alternatively, the RGB image 150 is saved in the storage unit. Alternatively, the RGB image 150 is output to another external information processing apparatus.

Note that, in some cases, an encoding process such as a compression process is executed as a preprocess for a saving process to the storage unit and an external output process.

In addition, turning the YUV signal into the RGB signal is not essential and the YUV signal may be configured to be output to a display apparatus, or saved in the storage unit, or output to the outside as it is.

Through such a process, an optimal false color reduction process according to the image characteristics is executed and it is possible to generate a high quality corrected image with few false colors.

[6. Other Configuration Examples of Image Processing Apparatus]

Next, other configuration examples of the image processing apparatus will be described.

The above-described embodiment employs a configuration in which, for example, the image processor 120 illustrated in FIG. 3 inputs the RGB-RAW image 112 which is a photographed image by the second imaging unit 108 to the development processor 121 to execute the image process by applying the YUV image 130 generated by the stringing elephant process for the RGB-RAW image 112.

The execution timing of this development process may be, for example, after the process of the image processor 120 is completed. Alternatively, a variety of settings can be made, including a configuration in which part of the process of the development processor is executed after the process of the image processor 120 is completed, for example.

In addition, the signal conversion unit 127 is configured to execute signal conversion from the YUV signal to the RGB signal as a final stage process of the image processor 120 illustrated in FIG. 3. However, as described earlier, this process is not essential and the YUV signal may be configured to be output to a display apparatus, or saved in the storage unit, or output to the outside as it is.

[7. Summary of Configuration of Present Disclosure]

The embodiments of the present disclosure have been minutely described with reference to certain embodiments. However, it is self-evident that modification and substitution of the embodiments can be made by a person skilled in the art without departing from the spirit of the present disclosure. That is, the present invention has been disclosed in the form of exemplification and should not be interpreted restrictively. In order to judge the spirit of the present disclosure, the section of claims should be considered.

Note that the technology disclosed in the present description can be configured as follows.

(1) An image processing apparatus including an image processor that receives inputs of a color image and a white (W) image photographed by a W array imaging element whose ail pixels are placed in a white (W) pixel array, and executes an image process that reduces false colors included in the color image, in which the image processor includes:

a frequency-corresponding parameter calculation unit that receives an input of the white (W) image and calculates a frequency-corresponding parameter of the white (W) image in units of image regions;

a positional deviation-corresponding parameter calculation unit that receives inputs of the white (W) image and the color image and calculates a positional deviation-corresponding parameter of the two input images in units of image regions; and an image correction unit that executes a blending process in which a blend rate between the white (W) image and the color image is controlled in accordance with values of the frequency-corresponding parameter and the positional deviation-corresponding parameter and calculates a corrected pixel value.

The image processing apparatus according to (1), in which the color image is an RGB image photographed by an RGB array imaging element, the positional deviation-corresponding parameter calculation unit receives inputs of the white (W) image and a YUV image generated on the basis of the RGB image and calculates a positional deviation-corresponding parameter of the two input images in units of image regions, and the image correction unit executes a blending process in which a blend rate between the white (W) image and the YUV image is controlled in accordance with values of the frequency-corresponding parameter and the positional deviation-corresponding parameter and calculates a corrected pixel value.

(3) The image processing apparatus according to (1) or (2), in which the image correction unit selectively applies a plurality of different low-pass filters (LPFs) having different cutoff frequencies in units of image regions and calculates a corrected pixel value.

(4) The image processing apparatus according to any one of (1) to (3), in which the image correction unit calculates:

(a) an LPF-applied color pixel value to which a low pass filter (LPF) is applied in units of regions of the color image; and (b) a division W pixel value obtained by dividing a pixel value of the white (W) image by a value to which a lowpass filter (LPF) is applied in units of regions of the white (W) image, and calculates a corrected pixel value by multiplying the two calculated values with each other.

(5) The image processing apparatus according to any one of (1) to (4), in which regarding a low-pass filter (LPF) to be applied in units of regions of the color image, the image correction unit:

preferentially applies a low-pass filter having a relatively low cutoff frequency in a high frequency region; and preferentially applies a low-pass filter having a relatively high cutoff frequency in a low frequency region.

(6) The image processing apparatus according to any one of (1) to (5), in which regarding a low-pass filter (LPF) to be applied in units of regions of the color image, the image correction unit:

preferentially applies a low-pass filter having a relatively low cutoff frequency in a region where a positional deviation is large; and preferentially applies a low-pass filter having a relatively high cutoff frequency in a region where a positional deviation is small.

(7) The image processing apparatus according to (2), in which the image correction unit calculates:

(a) an LPF-applied YUV pixel value to which a low-pass filter (LPF) is applied in units of regions of a YUV image; and (b) a division W pixel value obtained by dividing a pixel value of the white (W) image by a value to which a low-pass filter (LPF) is applied in units of regions of the white (W) image, and calculates a corrected pixel value by multiplying the two calculated values with each other.

(8) The image processing apparatus according to (2), in which the image correction unit calculates a UV value (Uout, Vout) calculated in line with the following corrected pixel value calculation formulas:

$$U\text{out}=\text{LPF}(U)\times(W/\text{LPF}(W));\text{ and}$$

$$V\text{out}=\text{LPF}(V)\times(W/\text{LPF}(W)),$$

in units of image regions of the YUV image as a corrected pixel value.

(9) The image processing apparatus according to (8), in which regarding a low-pass filter (LPF) to be applied to the corrected pixel value calculation formulas, the image correction unit:

preferentially applies a low-pass filter having a relatively low cutoff frequency in a high frequency region; and preferentially applies a low-pass filter having a relatively high cutoff frequency in a low frequency region.

(10) The image processing apparatus according to (8) or (9), in which regarding a low-pass filter (LPF) to be applied to the corrected pixel value calculation formulas, the image correction unit:

preferentially applies a low-pass filter having a relatively low cutoff frequency in a region where a positional deviation is large; and preferentially applies a low-pass filter having a relatively high cutoff frequency in a region where a positional deviation is small.

(11) The image processing apparatus according to any one of (1) to (10), in which the image processor includes a position alignment unit that executes position alignment between the color image and the white (W) image, and the positional deviation-corresponding parameter calculation unit receives inputs of the white (W) image and the color image after position alignment generated by the position alignment unit and calculates the positional deviation-corresponding parameter of the two input images in units of image regions.

(12) The image processing apparatus according to (11), in which the image processor includes a motion vector detection unit that receives inputs of the color image and the white (W) image and detects a motion vector between these two images, and the position alignment unit executes position alignment between the color image and the white (W) image using the motion vector.

(13) The image processing apparatus according to (12), in which the motion vector detection unit detects a motion vector representing a positional deviation between images based on parallax according to a deviation of photographing positions between an imaging unit for the color image and an imaging unit for the white (W) image.

(14) An imaging apparatus including:

a first imaging unit that has a W array imaging element whose all pixels are placed in a white (W) pixel array and photographs a white (W) image;

a second imaging unit that has an RGB array imaging element having an RGB pixel array and photographs a color image; and an image processor that receives inputs of the white (W) image and the color image and executes an image process that reduces false colors included in the color image, in which the image processor includes:

a frequency-corresponding parameter calculation unit that receives an input of the white (W) image and calculates a frequency-corresponding parameter of the white (W) image in units of image regions;

a positional deviation-corresponding parameter calculation unit that receives inputs of the white (W) image and the color image and calculates a positional deviation-corresponding parameter of the two input images in units of image regions; and an image correction unit that executes a blending process in which a blend rate between the white (W) image and the color image is controlled in accordance with values of the frequency-corresponding parameter and the positional deviation-corresponding parameter and calculates a corrected pixel value.

(15) An image processing method executed in an image processing apparatus, the image processing apparatus including an image processor that receives inputs of a color image and a white (W) image photographed by a W array imaging element whose all pixels are placed in a white (W) pixel array, and executes an image process that reduces false colors included in the color image, the image processing method including calculating, by the image processor, a corrected pixel value by executing:

a frequency-corresponding parameter calculation process of receiving an input of the white (W) image and calculating a frequency-corresponding parameter of the white (W) image in units of image regions;

a positional deviation-corresponding parameter calculation process of receiving inputs of the white (W) image and the color image and calculating a positional deviation-corresponding parameter of the two input images in units of image regions; and a blending process in which a blend rate between the white (W) image and the color image is controlled in accordance with values of the frequency-corresponding parameter and the positional deviation-corresponding parameter.

(16) An image processing method executed in an imaging apparatus, the imaging apparatus including:

a first imaging unit that has a W array imaging element whose all pixels are placed in a white (W) pixel array and photographs a white (W) image;

a second imaging unit that has an RGB array imaging element having an RGB pixel array and photographs a color image; and an image processor that receives inputs of the white (W) image and the color image and executes an image process that reduces false colors included in the color image, the image processing method including:

photographing, by the first imaging unit and the second imaging unit, the white (W) image and the color image; and calculating, by the image processor, a corrected pixel value by executing:

a frequency-corresponding parameter calculation process of receiving an input of the white (W) image and calculating a frequency-corresponding parameter of the white (W) image in units of image regions;

a positional deviation-corresponding parameter calculation process of receiving inputs of the white (W) image and the color image and calculating a positional deviation-corresponding parameter of the two input images in units of image regions; and a blending process in which a blend rate between the white (W) image and the color image is controlled in accordance with values of the frequency-corresponding parameter and the positional deviation-corresponding parameter.

(17) A program that causes an image processing apparatus to execute an image process, the image processing apparatus including an image processor that receives inputs of a color image and a white (W) image photographed by a W array imaging element whose all pixels are placed in a white (W) pixel array, and executes an image process that reduces false colors included in the color image, the program causing the image processor to execute a process of calculating a corrected pixel value by executing:

a frequency-corresponding parameter calculation process of receiving an input of the white (W) image and calculating a frequency-corresponding parameter of the white (W) image in units of image regions;

a positional deviation-corresponding parameter calculation process of receiving inputs of the white (W) image and the color image and calculating a positional deviation-corresponding parameter of the two input images in units of image regions; and a blending process in which a blend rate between the white (W) image and the color image is controlled in accordance with values of the frequency-corresponding parameter and the positional deviation-corresponding parameter.

(18) A program that causes an imaging apparatus to execute an image process, the imaging apparatus including:

a first imaging unit that has a W array imaging element whose all pixels are placed in a white (W) pixel array and photographs a white (W) image;

a second imaging unit that has an RGB array imaging element having an RGB pixel array and photographs a color image; and an image processor that receives inputs of the white (W) image and the color image and executes an image process that reduces false colors included in the color image, the program causing:

the first imaging unit and the second imaging unit to photograph the white (W) image and the color image; and the image processor to execute a process of calculating a corrected pixel value by executing:

a frequency-corresponding parameter calculation process of receiving an input of the white (W) image and calculating a frequency-corresponding parameter of the white (W) image in units of image regions;

a positional deviation-corresponding parameter calculation process of receiving inputs of the white (W) image and the color image and calculating a positional deviation-corresponding parameter of the two input images in units of image regions; and a blending process in which a blend rate between the white (W) image and the color image is controlled in accordance with values of the frequency-corresponding parameter and the positional deviation-corresponding parameter.

In addition, the series of processes described in the description can be executed by hardware, software, or a complex configuration of both. In the case of executing the processes by software, a program recording a processing sequence can be installed on a memory within a computer incorporated in dedicated hardware and executed or the program can be installed on a general-purpose computer capable of executing various processes and executed. For example, the program can be recorded in a recording medium in advance. In addition to installation from a recording medium to a computer, the program can be received via a network such as a local area network (LAN) or the Internet and installed on a recording medium such as a built-in hard disk.

Note that the various processes described in the description are not only executed in time series in line with the description but also may be executed in parallel or individually in accordance with the processing capability of an apparatus that executes the processes or in accordance with necessity. In addition, in the present description, the term "system" refers to a logical group configuration of a plurality of apparatuses and is not limited to a system in which apparatuses having respective configurations are accommodated in the same housing.

INDUSTRIAL APPLICABILITY

As described above, according to the configuration of an embodiment of the present disclosure, an apparatus and a method that perform a false color correction according to image characteristics of a color image in units of image regions are implemented.

Specifically, included therein is an image processor that receives inputs of a color image and a white (W) image photographed by a W array imaging element whose all pixels are placed in a white (W) pixel array and executes an image process that reduces false colors included in the color image. Together with a frequency-corresponding parameter calculation unit that receives an input of the white (W) image and calculates a frequency-corresponding parameter is units of image regions, and a positional deviation-corresponding parameter calculation unit that receives inputs of the white (W) image and the color image and calculates a positional deviation-corresponding parameter of the two input images in units of image regions, the image processor executes a blending process in which a blend rate between the white (W) image and the color image is controlled in accordance with values of the frequency-corresponding parameter and the positional deviation-corresponding parameter and calculates a corrected pixel values.

Through these processes, an apparatus and a method that perform a false color correction according to image characteristics of the color image in units of image regions are implemented and it becomes possible to generate and output a high quality image in which false colors are removed or reduced.

REFERENCE SIGNS LIST

100 Image processing apparatus
101 Control unit
102 Storage unit
103 Codec
104 Input unit
105 Output unit
106 Imaging unit
107 First imaging unit
108 Second imaging unit
111 W-RAW image
112 RGB-RAW image
113 Sensor noise characteristic ($\sigma$)
120 Image processor
121 Development processor
122 Motion vector detection unit
123 Position alignment unit
124 Frequency-corresponding parameter calculation unit
125 Positional deviation-corresponding parameter calculation unit
126 Image correction unit
127 Signal conversion unit
150 RGB image
151 Adjacent pixel pixel value difference absolute value calculation unit
152 Dynamic range (DR) calculation unit
153 Frequency parameter calculation unit
154 Addition unit
155 Blend ratio calculation unit
161 Position-aligned YUV image
162 YUV image-based W image
163 Pixel value-adjusted YUV image-based W image
164 Difference image
171 Signal conversion unit
172 First region unit pixel value addition unit
173 Second region unit pixel value addition unit
174 Region unit pixel non-calculation unit
175 Multiplication unit 176 Difference calculation unit.
201 Frequency-corresponding blend ratio setting parameter
202 Positional deviation-corresponding blend rate setting parameter
203 Corrected UV signal

The invention claimed is:

1. An image processing apparatus comprising an image processor that receives inputs of a color image and a white (W) image photographed by a W array imaging element whose all pixels are placed in a white (W) pixel array, and executes an image process that reduces false colors included in the color image, wherein
the image processor includes:
a frequency-corresponding parameter calculation unit that receives an input of the white (W) image and calculates a frequency-corresponding parameter of the white (W) image in units of image regions;
a positional deviation-corresponding parameter calculation unit that receives inputs of the white (W) image and the color image and calculates a positional deviation-corresponding parameter of the two input images in units of image regions; and
an image correction unit that executes a blending process in which a blend rate between the white (W) image and the color image is controlled in accordance with values of the frequency-corresponding parameter and the positional deviation-corresponding parameter and calculates a corrected pixel value.

2. The image processing apparatus according to claim 1, wherein
the color image is an RGB image photographed by an RGB array imaging element,
the positional deviation-corresponding parameter calculation unit receives inputs of the white (W) image and a YUV image generated on the basis of the RGB image and calculates a positional deviation-corresponding parameter of the two input images in units of image regions, and
the image correction unit executes a blending process in which a blend rate between the white (W) image and the YUV image is controlled in accordance with values of the frequency-corresponding parameter and the positional deviation-corresponding parameter and calculates a corrected pixel value.

3. The image processing apparatus according to claim 2, wherein
the image correction unit calculates:
(a) an LPF-applied YUV pixel value to which a low-pass filter (LPF) is applied in units of regions of a YUV image; and
(b) a division W pixel value obtained by dividing a pixel value of the white (W) image by a value to which a low-pass filter (LPF) is applied in units of regions of the white (W) image, and
calculates a corrected pixel value by multiplying the two calculated values with each other.

4. The image processing apparatus according to claim 2, wherein
the image correction unit calculates a UV value (Uout, Vout) calculated in line with the following corrected pixel value calculation formulas:

$U\text{out}=\text{LPF}(U)\times(W/\text{LPF}(W))$; and $V\text{out}=\text{LPF}(V)\times(W/\text{LPF}(W))$, in units of image regions of the YUV image as a corrected pixel value.

5. The image processing apparatus according to claim 4, wherein
regarding a low-pass filter (LPF) to be applied to the corrected pixel value calculation formulas,
the image correction unit:
preferentially applies a low-pass filter having a relatively low cutoff frequency in a high frequency region; and
preferentially applies a low-pass filter having a relatively high cutoff frequency in a low frequency region.

6. The image processing apparatus according to claim 4, wherein
regarding a low-pass filter (LPF) to be applied to the corrected pixel value calculation formulas,
the image correction unit:
preferentially applies a low-pass filter having a relatively low cutoff frequency in a region where a positional deviation is large; and
preferentially applies a low-pass filter having a relatively high cutoff frequency in a region where a positional deviation is small.

7. The image processing apparatus according to claim 1, wherein
the image correction unit selectively applies a plurality of different low-pass filters (LPFs) having different cutoff frequencies in units of image regions and calculates a corrected pixel value.

8. The image processing apparatus according to claim 1, wherein
the image correction unit calculates:
(a) an LPF-applied color pixel value to which a low-pass filter (LPF) is applied in units of regions of the color image; and
(b) a division W pixel value obtained by dividing a pixel value of the white (W) image by a value to which a low-pass filter (LPF) is applied in units of regions of the white (W) image, and
calculates a corrected pixel value by multiplying the two calculated values with each other.

9. The image processing apparatus according to claim 1, wherein
regarding a low-pass filter (LPF) to be applied in units of regions of the color image,
the image correction unit:
preferentially applies a low-pass filter having a relatively low cutoff frequency in a high frequency region; and
preferentially applies a low-pass filter having a relatively high cutoff frequency in a low frequency region.

10. The image processing apparatus according to claim 1, wherein
regarding a low-pass filter (LPF) to be applied in units of regions of the color image,
the image correction unit:
preferentially applies a low-pass filter having a relatively low cutoff frequency in a region where a positional deviation is large; and
preferentially applies a low-pass filter having a relatively high cutoff frequency in a region where a positional deviation is small.

11. The image processing apparatus according to claim 1, wherein
the image processor includes a position alignment unit that executes position alignment between the color image and the white (W) image, and the positional deviation-corresponding parameter calculation unit receives inputs of the white (W) image and the color image after position alignment generated by the position alignment unit and calculates the positional deviation-corresponding parameter of the two input images in units of image regions.

12. The image processing apparatus according to claim 11, wherein
the image processor includes a motion vector detection unit that receives inputs of the color image and the white (W) image and detects a motion vector between these two images, and
the position alignment unit executes position alignment between the color image and the white (W) image using the motion vector.

13. The image processing apparatus according to claim 12, wherein
the motion vector detection unit detects a motion vector representing a positional deviation between images based on parallax according to a deviation of photographing positions between an imaging unit for the color image and an imaging unit for the white (W) image.

14. An imaging apparatus comprising:
a first imaging unit that has a W array imaging element whose all pixels are placed in a white (W) pixel array and photographs a white (W) image;
a second imaging unit that has an RGB array imaging element having an RGB pixel array and photographs a color image; and
an image processor that receives inputs of the white (W) image and the color image and executes an image process that reduces false colors included in the color image, wherein
the image processor includes:
   a frequency-corresponding parameter calculation unit that receives an input of the white (W) image and calculates a frequency-corresponding parameter of the white (W) image in units of image regions;
   a positional deviation-corresponding parameter calculation unit that receives inputs of the white (W) image and the color image and calculates a positional deviation-corresponding parameter of the two input images in units of image regions; and
   an image correction unit that executes a blending process in which a blend rate between the white (W) image and the color image is controlled in accordance with values of the frequency-corresponding parameter and the positional deviation-corresponding parameter and calculates a corrected pixel value.

15. An image processing method executed in an image processing apparatus that includes an image processor that receives inputs of a color image and a white (W) image photographed by a W array imaging element whose all pixels are placed in a white (W) pixel array, and executes an image process that reduces false colors included in the color image, the image processing method comprising:
calculating, by the image processor, a corrected pixel value by executing:
   a frequency-corresponding parameter calculation process of receiving an input of the white (W) image and calculating a frequency-corresponding parameter of the white (W) image in units of image regions;
   a positional deviation-corresponding parameter calculation process of receiving inputs of the white (W) image and the color image and calculating a positional deviation-corresponding parameter of the two input images in units of image regions; and
   a blending process in which a blend rate between the white (W) image and the color image is controlled in accordance with values of the frequency-corresponding parameter and the positional deviation-corresponding parameter.

16. An image processing method executed in an imaging apparatus that includes a first imaging unit that has a W array imaging element whose all pixels are placed in a white (W) pixel array and photographs a white (W) image, a second imaging unit that has an RGB array imaging element having an RGB pixel array and photographs a color image, and an image processor that receives inputs of the white (W) image and the color image and executes an image process that reduces false colors included in the color image, the image processing method comprising:
photographing, by the first imaging unit and the second imaging unit, the white (W) image and the color image; and
calculating, by the image processor, a corrected pixel value by executing:
   a frequency-corresponding parameter calculation process of receiving an input of the white (W) image and calculating a frequency-corresponding parameter of the white (W) image in units of image regions;
   a positional deviation-corresponding parameter calculation process of receiving inputs of the white (W) image and the color image and calculating a positional deviation-corresponding parameter of the two input images in units of image regions; and
   a blending process in which a blend rate between the white (W) image and the color image is controlled in accordance with values of the frequency-corresponding parameter and the positional deviation-corresponding parameter.

17. A non-transitory computer-readable medium having embodied thereon a program, which when executed by an image processor of an image processing apparatus, the image processing apparatus including the image processor that receives inputs of a color image and a white (W) image photographed by a W array imaging element whose all pixels are placed in a white (W) pixel array, and executes an image process that reduces false colors included in the color image, causes the image processor to execute an image processing method, the image processing method comprising:
a process of calculating a corrected pixel value by executing:
   a frequency-corresponding parameter calculation process of receiving an input of the white (W) image and calculating a frequency-corresponding parameter of the white (W) image in units of image regions;
   a positional deviation-corresponding parameter calculation process of receiving inputs of the white (W) image and the color image and calculating a positional deviation-corresponding parameter of the two input images in units of image regions; and
   a blending process in which a blend rate between the white (W) image and the color image is controlled in accordance with values of the frequency-corresponding parameter and the positional deviation-corresponding parameter.

18. A non-transitory computer-readable medium having embodied thereon a program, which when executed by an image processor of an imaging apparatus, the imaging apparatus including a first imaging unit that has a W array imaging element whose all pixels are placed in a white (W) pixel array and photographs a white (W) image, a second imaging unit that has an RGB array imaging element having an RGB pixel array and photographs a color image, and the image processor that receives inputs of the white (W) image and the color image and executes an image process that reduces false colors included in the color image, causes the image processor to execute an image processing method, the image processing method comprising:

causing the first imaging unit and the second imaging unit to photograph the white (W) image and the color image; and causing the image processor to execute a process of calculating a corrected pixel value by executing:

a frequency-corresponding parameter calculation process of receiving an input of the white (W) image and calculating a frequency-corresponding parameter of the white (W) image in units of image regions;

a positional deviation-corresponding parameter calculation process of receiving inputs of the white (W) image and the color image and calculating a positional deviation-corresponding parameter of the two input images in units of image regions; and a blending process in which a blend rate between the white (W) image and the color image is controlled in accordance with values of the frequency-corresponding parameter and the positional deviation-corresponding parameter.

\* \* \* \* \*